April 22, 1947.  H. I. DANZIGER  2,419,484
CONDENSER ASSEMBLING MACHINE
Filed Sept. 28, 1942   11 Sheets-Sheet 2
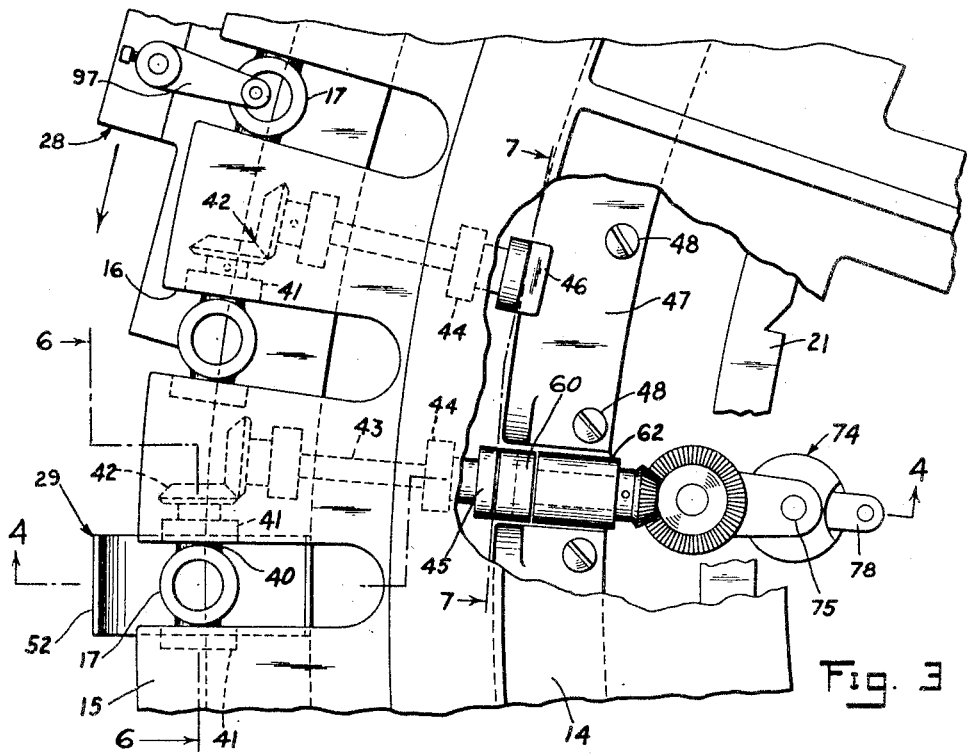
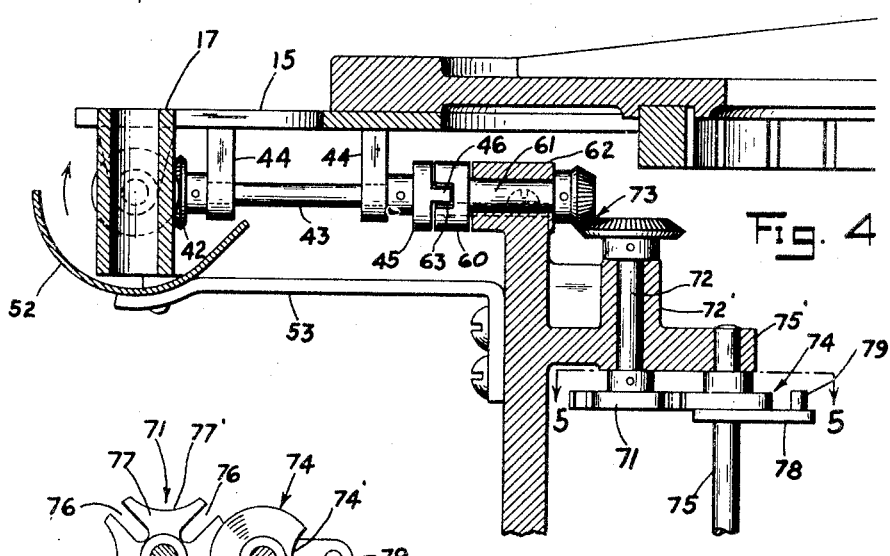
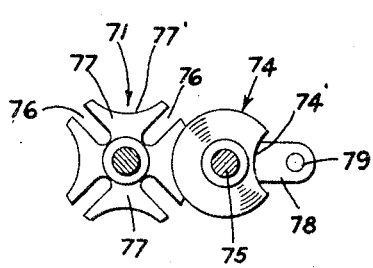
INVENTOR.
Harold I. Danziger
George H. Fritzinger
ATTORNEY.

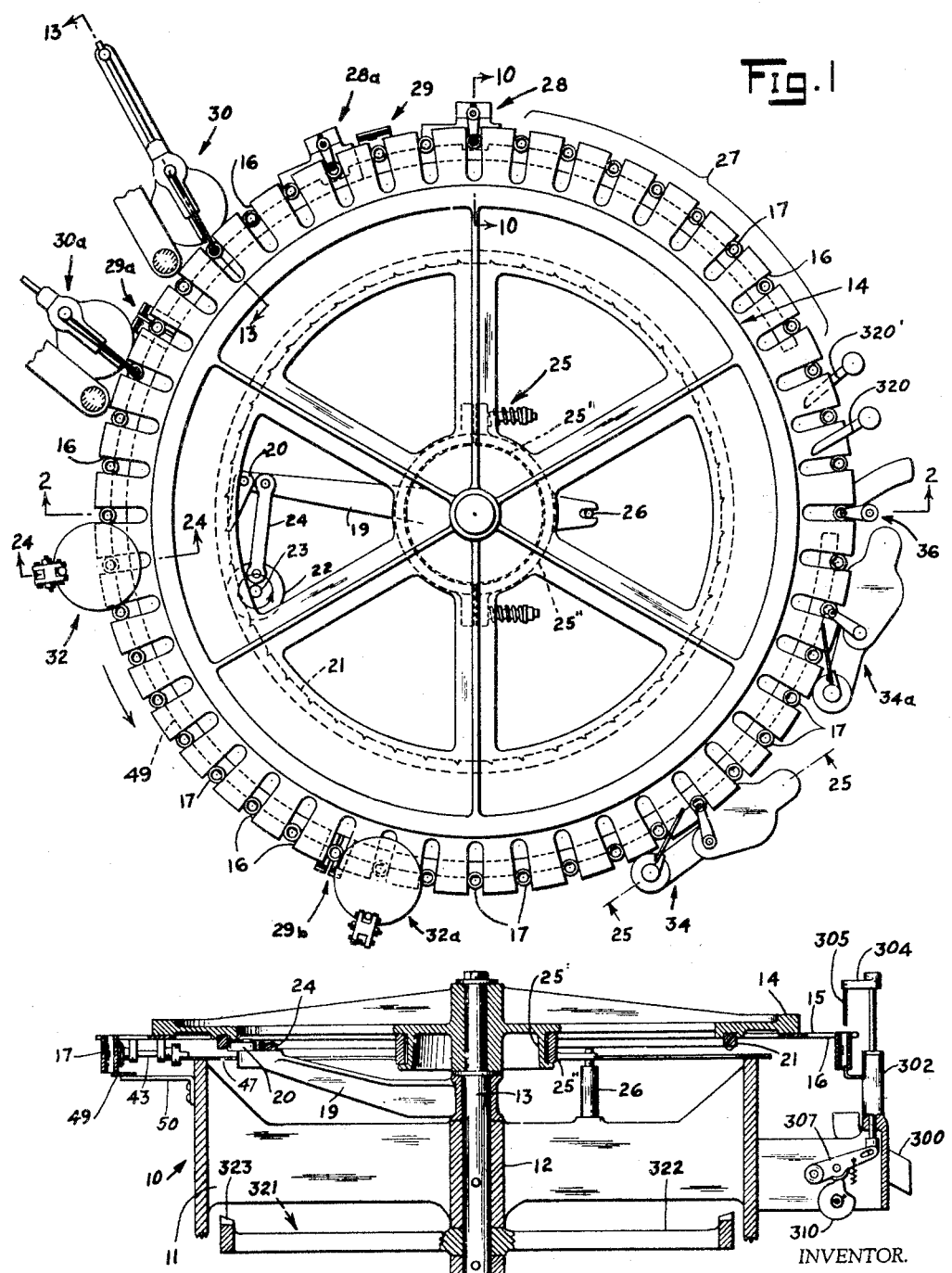

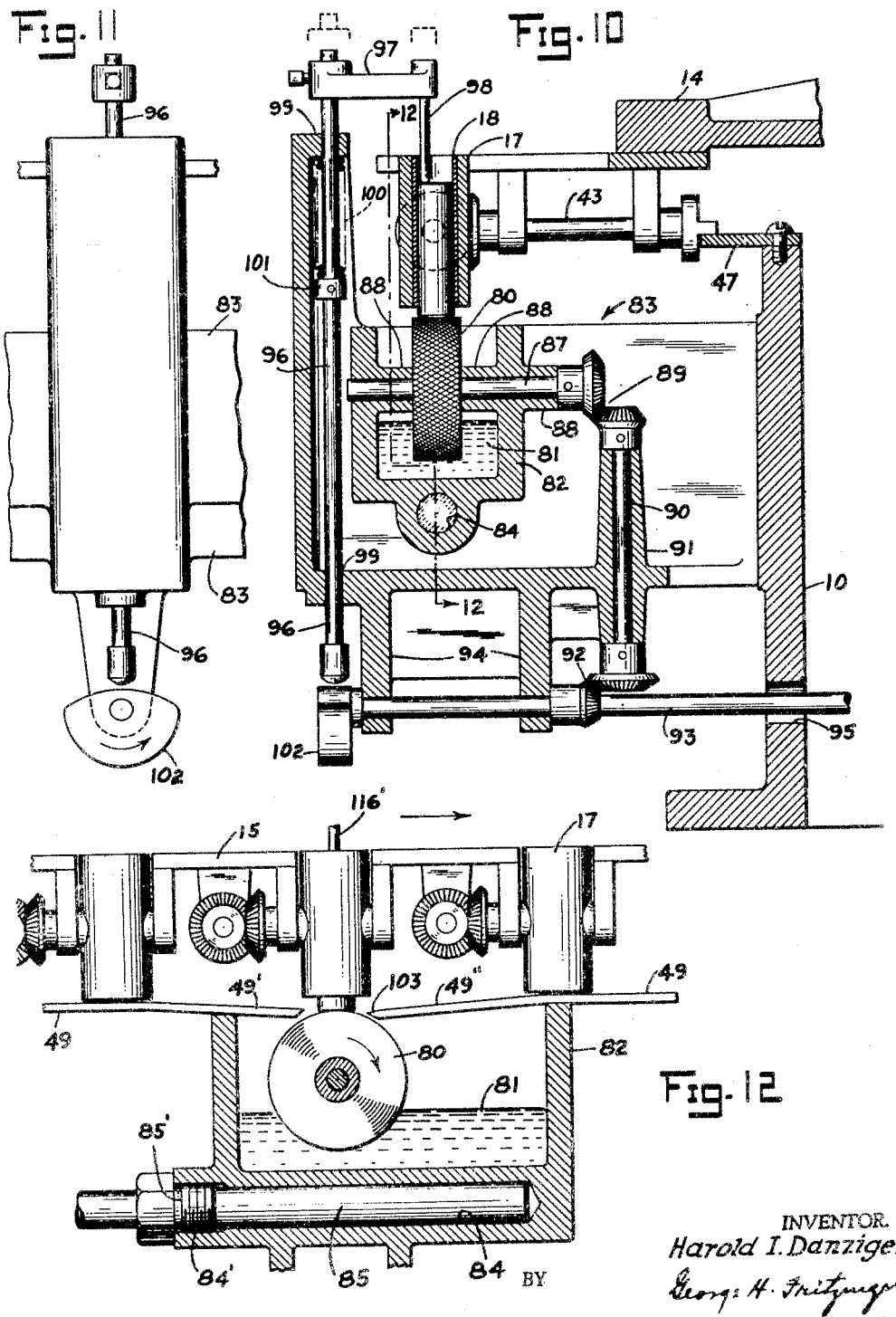

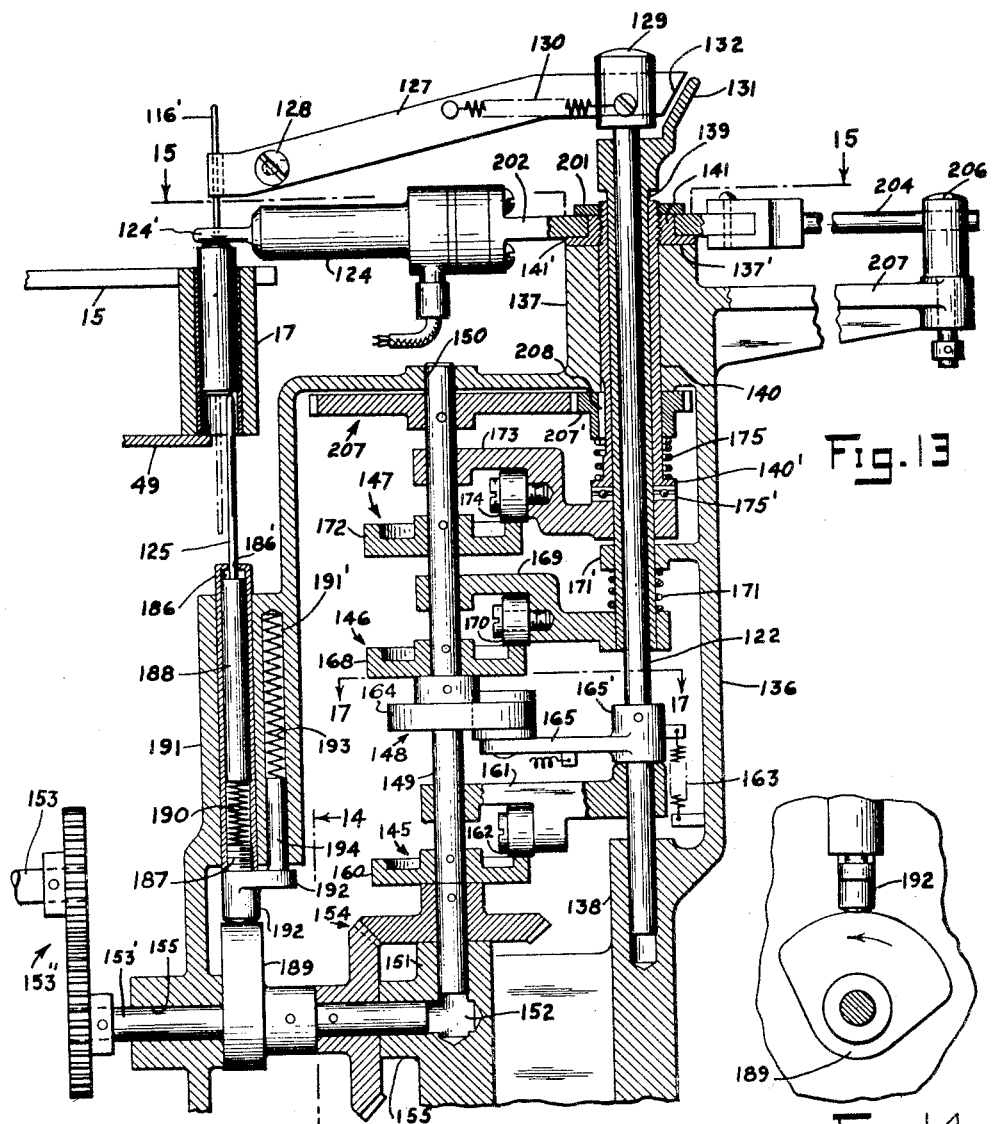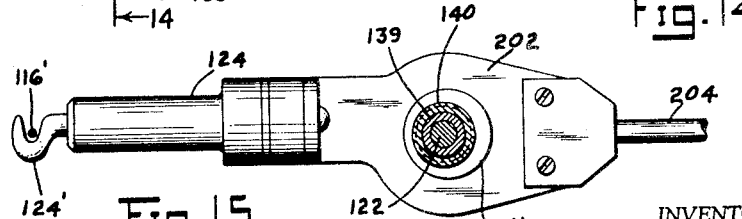

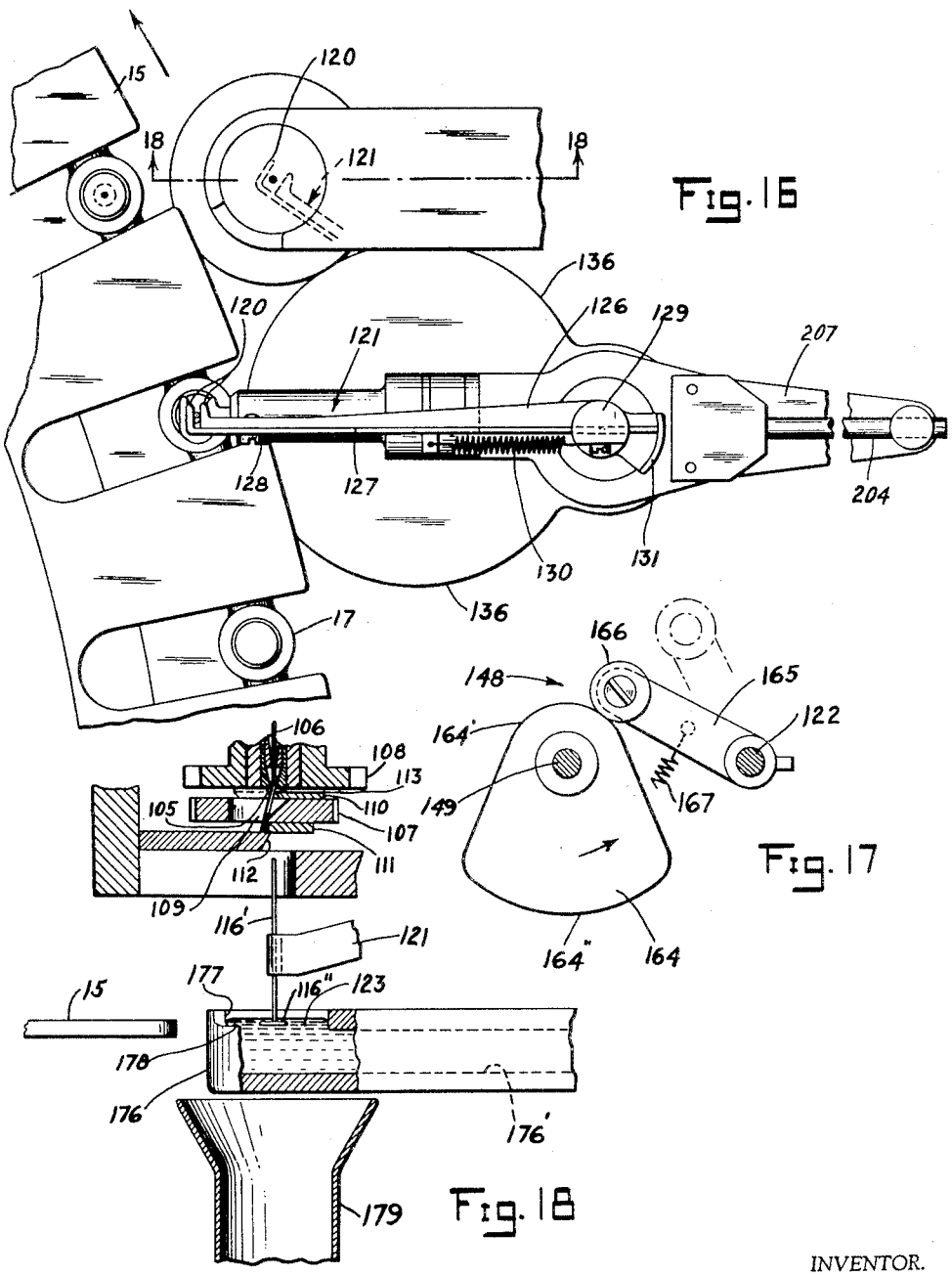

April 22, 1947.   H. I. DANZIGER   2,419,484
CONDENSER ASSEMBLING MACHINE
Filed Sept. 28, 1942   11 Sheets-Sheet 7

ONE COMPLETE REVOLUTION OF CAM SHAFTS

INVENTOR
Harold I. Danziger
BY George H. Fritzinger
ATTORNEY

April 22, 1947. H. I. DANZIGER 2,419,484
CONDENSER ASSEMBLING MACHINE
Filed Sept. 28, 1942 11 Sheets-Sheet 8

INVENTOR.
Harold I. Danziger
BY George H. Fritzinger
ATTORNEY.

April 22, 1947. H. I. DANZIGER 2,419,484
CONDENSER ASSEMBLING MACHINE
Filed Sept. 28, 1942 11 Sheets-Sheet 9

INVENTOR.
Harold I. Danziger
BY George H. Fritzinger
ATTORNEY.

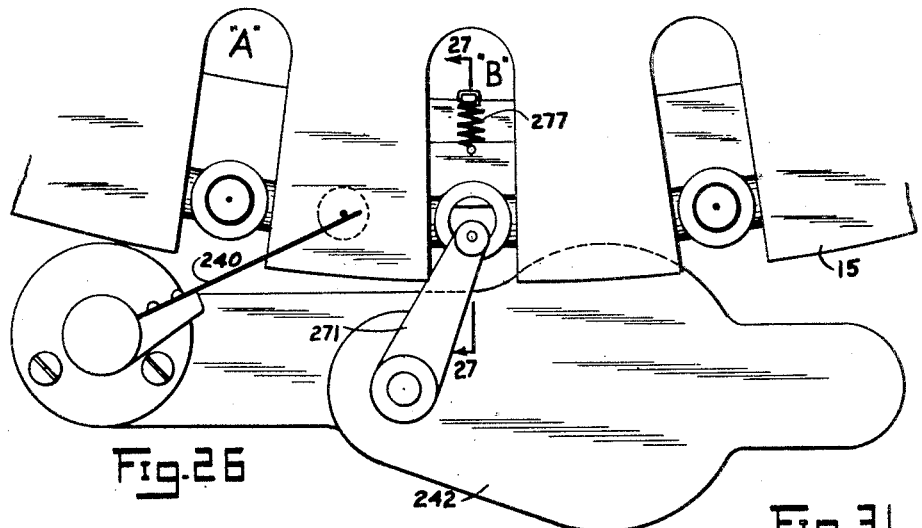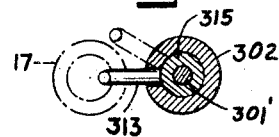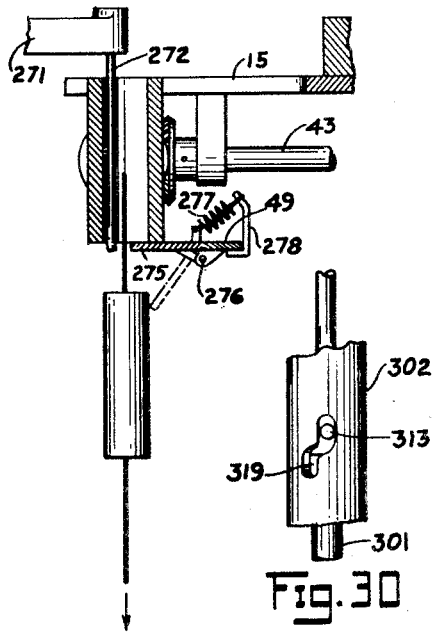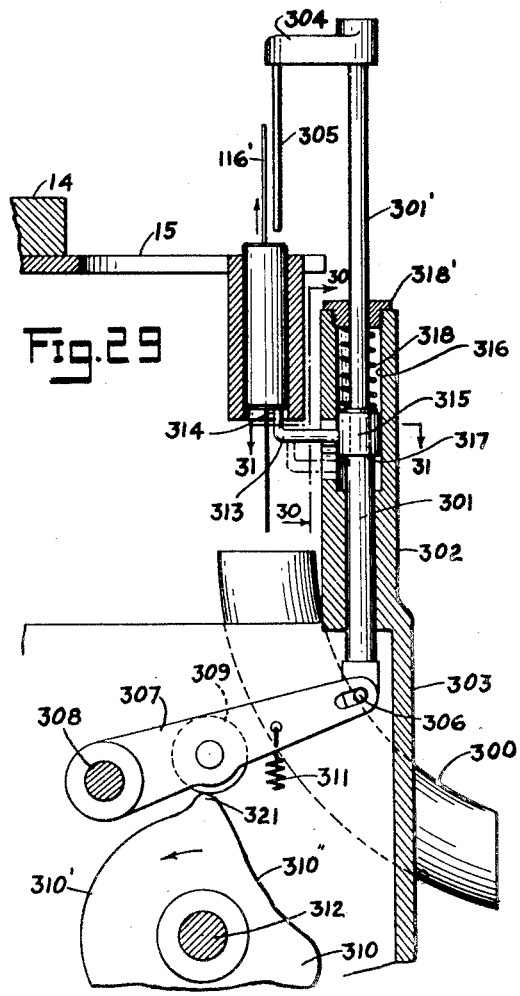

April 22, 1947.  H. I. DANZIGER  2,419,484
CONDENSER ASSEMBLING MACHINE
Filed Sept. 28, 1942  11 Sheets-Sheet 11

INVENTOR
Harold I Danziger
BY George H. Fritzinger
ATTORNEY

Patented Apr. 22, 1947

2,419,484

UNITED STATES PATENT OFFICE 2,419,484

CONDENSER ASSEMBLING MACHINE

Harold I. Danziger, West Orange, N. J.

Application September 28, 1942, Serial No. 460,016

13 Claims. (Cl. 29—25.42)

This invention relates to a machine for producing electrical condensers and, more particularly, to a unitary, integrated machine for assembling automatically the body, shell and terminals of condensers in succession and for testing the assembled condensers and sorting them according to their characteristics.

In accordance with the present invention, the entire assembling process is carried out automatically except for a loading of the machine with loose condenser body and shell units—which may be done manually by feeding these units in succession to a travelling conveyor or table of the machine. Thereupon the machine performs different successive operations on these units in such sequence and timing as to place the units in finished form. The different operations performed in each condenser are, in the order of their performance, a tinning of the opposite ends of the condenser body—which may typically be of the paper-foil form; a forming, applying and soldering of terminals to the opposite ends of the condenser body; a sealing and closing of the opposite ends of the shell to retain the condenser body in place; a testing of the condenser for a short-circuit condition and subsequent ejection of the same from the machine should it test defective; a testing of the condenser for capacity (should it have passed the short-circuit testing station) and subsequent ejecting of the same from the machine should it exceed prescribed tolerance limits; and then an ejecting of the condenser from the machine should it have passed both of the foregoing tests. This cycle of operations is repeated continuously on successive condensers, the different operations being performed simultaneously on different condensers.

It is an object of my invention to provide a new and improved machine for the purpose here stated.

It is another object to provide a machine which is capable of carrying out the above stated functions in a positive and dependable manner.

It is a further object to provide a machine which is capable of producing finished condensers on an efficient commercial basis.

It is another object to provide a practical machine for the purposes here stated which is simple in construction and in operation.

It is a more particular object to provide improved means and methods for performing the several operations by which the condenser parts are placed into finished units.

It is another object to correlate the sequential operations of the machine in a novel and improved manner to enable a simplification and standardization in structure and further to enable a more reliable and efficient operation of the machine.

Still other and allied objects of my invention will more fully appear from the following description and the appended claims.

In the description of my invention, reference is had to the accompanying drawings, of which:

Figure 1 is a top plan view of the machine;

Figure 2 is a vertical cross section taken on the line 2—2 of Figure 1;

Figure 3 is a fragmentary enlarged top plan view of the machine showing the first tinning and turning stations;

Figure 4 is a vertical sectional view taken substantially on the line 4—4 of Figure 3;

Figure 5 is a horizontal sectional view taken on the line 5—5 of Figure 4;

Figure 10 is a partial enlarged vertical sectional view of the first tinning station taken substantially on the line 10—10 of Figure 1;

Figure 11 is a fragmentary front elevational view of the structure of Figure 10;

Figure 12 is a vertical cross sectional view taken substantially on the line 12—12 of Figure 10;

Figure 13 is an enlarged fragmentary vertical section of the first terminal-soldering station taken substantially on the line 13—13 of Figure 1;

Figure 14 is a fragmentary vertical section taken substantially on the line 14—14 of Figure 13;

Figure 15 is a fragmentary horizontal section taken substantially on the line 15—15 of Figure 13;

Figure 16 is a partial enlarged top plan view of the first terminal-soldering station;

Figure 17 is a fragmentary horizontal section taken substantially on the line 17—17 of Figure 13;

Figure 18 is a side view of a part of the terminal-soldering station, partially in vertical section substantially on the line 18—18 of Figure 16;

Figure 26 is an enlarged top plan view of the testing station shown in Figure 25;

Figure 27 is a fragmentary vertical section taken substantially on the line 27—27 of Figure 26;

Figure 29 is a partial enlarged vertical sectional view of the station for ejecting the finished condensers from the machine.

Figure 30 is a fragmentary vertical section taken substantially on the line 30—30 of Figure 29; and Figure 31 is a fragmentary horizontal section taken substantially on the line 31—31 of Figure 29.

Figure 6:
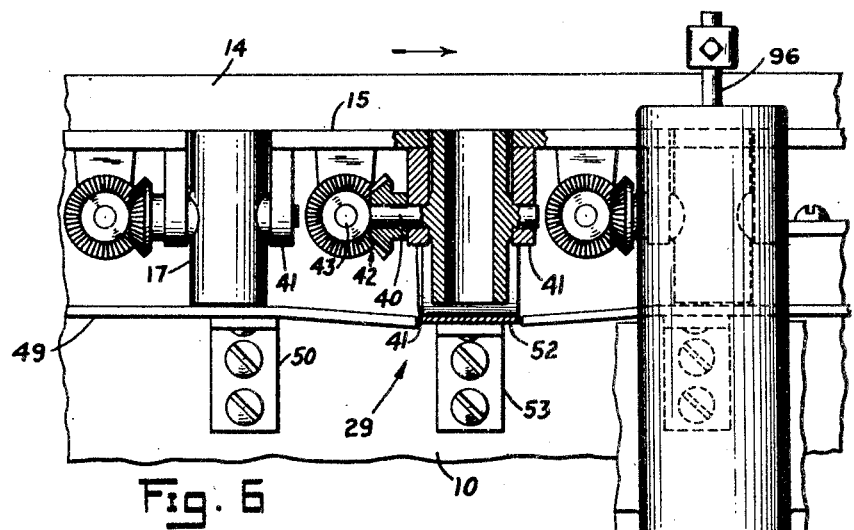
Figure 6 is a fragmentary side view of the machine showing in particular the first turning station and the second tinning station, the turning station appearing in vertical section on the line 6—6 of Figure 3.

The illustrative embodiment of my invention herein disclosed comprises a main frame 10 of a generally circular form as viewed from the top (see Figures 1 and 2). This frame has radial webs 11 supporting a central bearing 12 in which there is journalled a vertical shaft 13. Carried by the shaft 13 above the frame is circular table 14 comprising a central spider and a circular horizontal shelf 15 disposed about the periphery of the spider. In the shelf at equally spaced intervals are radial slots 16, and disposed in each slot is a tumbler 17. These tumblers are in the form of tubes having bores to receive the shells 18 of the condensers. The shells are to fit snugly the bores of the tumblers; to adapt the tumblers for shells of different diameters, the shells may be bushed up as the particular conditions may require.

In the operation of the machine, the table is advanced with an intermittent rotary motion in a counter-clockwise direction, the distance of each interval of advance being such as to bring each tumbler 17 into the position previously occupied by the one immediately ahead of it. This intermittent advance of the table is effected by a ratchet mechanism comprising a lever 19 pivoted on the shaft 13 beneath the table and pivotally carrying a pawl 20 which engages a circular rack 21 mounted on the underside of the table. A reciprocatory movement of the lever such as will advance the table intermittently an interval at a time is effected by a rotating wheel 22 carried on a shaft 23 and coupled by a link 24 to the lever 19. A brake 25, which comprises a drum 25' and a brake band 25" frictionally embracing the drum and held stationary to the frame through a post 26, serves to prevent inertia overrunning of the table at the end of each advance and to hold the table stationary between successive advances.

The tumblers 17 each have trunnions 40 which are journalled in standards 41 that extend down from the shelf 15 at opposite sides of each slot 16 (see Figures 3, 4 and 6). One trunnion of each tumbler is coupled by right-angle bevel gearing 42 to a shaft 43 which extends radially inwardly of the table and which is journalled in standards 44 provided on the underside of the shelf 15. A circular head 45 is pinned to the inner end of each shaft 43 and each head is provided on its inner face with a diametrical tongue 46. While the shafts 43 are provided for turning the tumblers, as will hereinafter be apparent, the tumblers are normally held stationary in vertical positions as shown. This is done by a rotation-constraining means consisting of arcuate plates 47 which are secured by screws 48 to the top edge of the frame 10, these plates being so positioned that they bear slidably against the undersides of the tongues 46 and hold the shafts 43 from turning, as appears in Figures 2, 3, 4 and 7. To prevent the condenser bodies and shells from falling out of the tumblers, arcuate retaining plates 49 are provided below the tumblers; these plates are supported by the frame 10 through brackets 50 in horizontal positions wherein they partially close the lower ends of the tumblers, as is shown in Figures 2 and 6.

At the place designated by the bracket 27 in Figure 1, which place is hereinafter referred to as the "loading station," the loose condenser shell and body elements are fed to the machine, there being a shell and a body inserted in each tumbler as it passes through this station. Following the loading station and spaced at suitable intervals about the table are the stations which perform the separate operations by which the condenser parts are assembled and the finished condensers are tested and ejected from the machine. These stations appear in the following order as one proceeds from the loading station about the table in the direction of its advance: a first "tinning station" 28 for applying solder to one end of each condenser body, a "turning station" 29 for inverting each tumbler, a second "tinning station" 28a for applying solder to the other end of each condenser body, a first station 30 for forming a terminal and applying and soldering the same to one tinned end of each condenser body, which station is referred to simply as a "terminal-soldering station," a second "turning station" 29a, a second "terminal-soldering station" 30a for soldering a terminal to the other tinned end of each body, a first "sealing station" 32 for sealing closed one end of each shell, a third "turning station" 29b, a second "sealing station" 32a for sealing closed the opposite end of each shell, a "short-circuit testing station" 34 for testing the finished condensers for short circuits and ejecting those from the machine which test defective, a "capacity-testing station" 34a for testing the condensers for capacity and ejecting those exceeding prescribed tolerance limits, and an "ejecting station" 36 for discharging from the machine the condensers which have passed the testing stations.

My invention contemplates that, in the performance of the respective tinning, terminal-soldering and sealing operations, a first one of such operations will be performed on one end of a condenser unit, the condenser unit will be next inverted and then a second of such operations will be performed on the other end thereof. Preferably, however, I provide separate stations or mechanisms for performing such repeated operations. Accordingly, there are provided a pair of tinning, terminal-soldering and sealing stations, respectively, and between each pair of such stations there is provided a turning station for successively inverting the condensers. In this way the stations of each pair are permitted to be identical, each to operate on the successive condensers in the most effective and efficient manner; also, there is realized a greater standardization of parts in the machine with a consequent reduction in cost of the overall machine.

*Tinning stations*

The tinning stations herein next described are not claimed herein since the same are described and claimed in my pending divisional application Serial No. 702,873, filed October 11, 1946, and entitled Coating machine.

The first tinning station, shown in detail in Figures 10, 11 and 12, comprises a continuously rotating roller 80 partially immersed in a molten solder bath 81. The peripheral surface of the roller is provided with small pockets, as by knurling, in order that it may effectively pick up the solder and carry it from the bath as the roller rotates. Each condenser body conveyed from the loading station to this first tinning station is moved directly overhead the roller 80; then while the table is at rest the condenser body at this station is pressed down through its shell onto the knurled surface of the roller. Solder is thus carried to the condenser body to tin the lower end thereof.

The solder bath 81 is contained in a trough 82 which is supported by an outwardly extending, subsidiary frame portion 83 of the main frame 10. In the bottom wall of the trough there is a chamber 84 in which there is housed an electrical heating unit 85 for maintaining the solder bath in a properly heated state, the open end portion 84' of the chamber being counterbored and threaded to receive a threaded hub portion 85' of the heating unit whereby to hold the unit in place. The roller 80 is secured to a horizontal shaft 87 which is journalled in bearings 88 provided in the side walls of the trough. The shaft 87 is coupled through right-angle bevel gearing 89 to a vertical shaft 90 which is journalled in a bearing 91 of the frame 83; this vertical shaft is in turn coupled through right-angle bevel gearing 92 to a horizontal drive shaft 93 journalled in standards 94 of the frame 83. The drive shaft 93 extends inwardly through an opening 95 in the main frame 10 and therewithin makes connection with a suitable source of power, as is hereinafter explained, from which source it receives one revolution of continuous movement for each step of advance of the table.

Successive ones of the retaining plates 49 are spaced apart at the tinning station, and the open space between the ends of the plates is occupied by the top portion of the roller 80, the roller being positioned though at a level somewhat below that of the lower ends of the tumblers as is shown in Figure 12, this lowered positioning of the roller being to prevent the depositing of solder onto the tumblers. The end portion 49' of the retaining plate which precedes the roller in respect of the direction of advance of the table, is inclined downwardly substantially to the level of the top portion of the roller. Thus, the condenser bodies, as they are conveyed to the tinning station, are permitted to move down gradually by their own weight onto the roller. However, to insure not only a contact but also a definite pressure of each condenser body against the roller, each condenser body is spring-pressed against the roller during the interval of its occupancy of the tinning station. The mechanism for so pressing the condenser bodies against the roller includes a plunger rod 96 at the side of the table which has an arm 97 at its upper end overhanging the shelf 15 and carrying a downwardly extending pin 98 in line overhead with the bore of the tumbler at the tinning station. The plunger rod 96 slides vertically in a pair of spaced bearings 99 of the frame 83, and is biased downwardly by a compression spring 100 interposed between the upper one of the bearings 99 and a collar 101 on the rod. The plunger rod is controlled at the bottom by a cam 102. This cam is of the one-lobe type and is mounted on the outer end of the aforementioned drive shaft 93 to receive one revolution of movement for each step of advance of the table. The cam is timed in relation to the ratchet advance for the table so that the lobe thereof will engage the plunger rod and hold it in a raised position, wherein the pin 98 clears the tumblers, while the table is in movement and so that the recession of the cam will traverse the end of the plunger rod and free the rod to move down under the influence of the spring 101 while the table is at rest. When the plunger rod is so moved downwardly, the pin 98 enters the tumbler at the tinning station and presses the condenser body which is within this tumbler down onto the roller 80, the movement of the condenser body being relative to the shell as the latter tightly fits and is held stationary to the tumbler. This relative movement of the body to the shell has the advantage of preventing solder from being deposited onto the end of the shell.

As the table advances, the condenser body at the tinning station is slid off from the roller 80 onto the end portion 49'' of the next succeeding one of the retaining plates 49, there being a bevel 103 on the end portion 49'' so that the condenser body may pass smoothly from the roller onto the plate, as is shown in Figure 12. This end portion 49'' is inclined upwardly so as to cam the condenser body back to its normal level within the tumbler as the body is conveyed one step of advance beyond the tinning station.

Suitably beyond the first tinning station 28 there is located the second tinning station 28a. However, between these stations, as at a distance of one interval of advance before the second of these stations, there is located the turning station 29. This turning station inverts the tumblers so as to bring the upper untinned ends of the condenser bodies to the lower position before they enter the second of the tinning stations. By this inversion, the second tinning station, which is made identical with the first, will tin the other end of each condenser body in same way as is above described.

*Turning stations*

Figure 7:
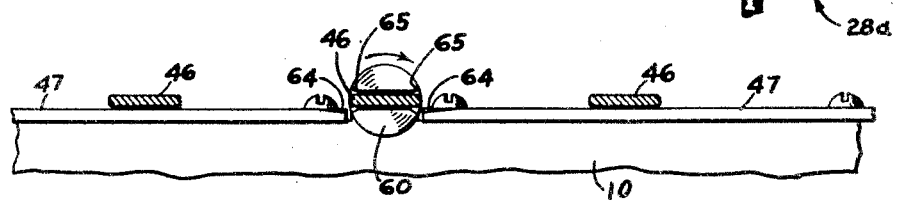
Figure 7 is a partial vertical sectional view taken substantially on the line 7—7 of Figure 3.

At the turning station 29, there is another break in the continuity of the retaining plates 49 to provide an open space, and in this space there is located an upwardly curved member 52, which is supported by the main frame through a bracket 53, as is shown in Figures 4 and 6. The member 52 is made about one-half circle in length and serves to retain the condenser bodies in the tumblers while the same are being inverted. Also, at this station there is a break in the continuity of the constraining plates 47, and in the open space so provided there is mounted a rotatable circular head 60, as is shown in Figures 3, 4 and 7. This head is secured to the outer end of a horizontal shaft 61 which extends radially inwardly of the main frame, the same being journalled to the frame in a bearing 62. The end face of this head is provided with a diametrical groove 63, and the vertical positioning of the head in relation to the level of the constraining plates is such that when the groove is in horizontal position it is disposed just wholly above the top surface of the plates. The head 60 is turned intermittently through one-half turn for each step of advance of the table, but is held stationary, with the groove 63 in horizontal position, during each period of advance of the table. As a tumbler enters this turning station, a tongue 46 aforementioned will slide from the last succeeding one of the constraining plates into engagement with the groove 63, a tumbler becoming thus coupled through the heads 45 and 60 to the shaft 61 to receive turning motion therefrom. To facilitate the entry of the tongues 46 into the grooves 63, the ends of the constraining plates are provided with bevels 64 and the ends of the grooves 63 are flared outwardly at 65, as is shown in Figure 7.

The shaft 61 is driven intermittently through successive one-half revolutions by a Geneva mechanism, shown in Figures 3, 4 and 5. This mechanism includes a driven wheel 71 coupled to the shaft 61 through a vertical shaft 72 journalled to the main frame in a bearing 72', and through a right-angle bevel gearing 73 a 2:1 step-up in transmission ratio. The wheel 71 is driven by a member 74 secured to a vertical drive shaft 75 which is journalled in a standard 75' and rotated continuously through one revolution for each step of advance of the table. The driven wheel has four radial slots 76 which separate four similar teeth 77. Each tooth has its outer edge 77' so curved that when the tooth is directed symmetrically toward the drive shaft 75, this edge describes an arc about the drive shaft as a center. The drive member is circular except for an arcuate recess 74'. At this recess the drive member is provided with a radially extending arm 78 which carries a drive pin 79 at its outer end. The driven wheel is held locked during ¾ of each turn of the drive member by the sliding engagement of the periphery of the drive member with the outer edge 77' of the adjacent one of the teeth 77. During the remaining ¼ turn of the drive member, however, the drive pin 79 engages a slot 76 of the wheel 71 and turns the wheel through ¼ revolution, the teeth 77 being swept through the recess 74' as the wheel 73 is so moved. These successive one-quarter revolutions of the wheel 71 are stepped up twice by the gearing 73 to transmit successive one-half revolutions to the shaft 61.

The successive actuations of the Geneva mechanism occur during successive rest periods of the table, when the heads 45 and 60 are in coupled relation. Thus, these actuations are transmitted to the successive tumblers to invert the same in succession. Preferably, each actuation of the Geneva mechanism is timed to occur during the intermediate ½ part of each return stroke of the reciprocating lever 19 of the ratchet drive aforementioned. As so arranged, the tumbler turning means is idle for a substantial portion of each rest period of the table both following the termination of each advance of the table and preceding the start of the next succeeding advance. This provides a safety factor to insure that the head 60 will be held stationary until the tongue 46 and groove 63 come into full engagement before the intermittent motion of the head 60 is started, and likewise to insure that each separate movement of the head will be completed before the next succeeding advance of the table is started.

From the foregoing description, it is seen that, in each advance of the table, a tongue 46 is brought into engagement with the slot 63 to couple a tumbler with the Geneva mechanism; and that during the rest period of the table the Geneva mechanism is actuated to invert that tumbler. In the next advance of the table the tongue 46, which is associated with the tumbler just inverted, is slid back onto the next succeeding one of the constraining plates 47 to hold the tumbler constrained against rotation as it is carried on to the next station; whereas the next succeeding tumbler is moved into coupled relation with the Geneva mechanism to be inverted during the next succeeding rest period of the table, these operations being repeated on the successive tumblers conveyed to the turning station.

Terminal-soldering stations

The first terminal-soldering station 30 is positioned suitably beyond the second tinning station 28a as, for example, at a distance of three intervals of advance of the table 14. This station, which is shown and illustrated in Figures 13 to 23 inclusive, performs a cycle of operations during each time of an advance and a successive rest period of the table. In each such cycle of operations a wire terminal is formed and soldered to the upper end of the condenser body at the terminal-soldering station.

The terminals are formed preferably by a machine of the type disclosed in my Patent No. 2,067,521, issued January 12, 1937, and entitled "Machine for making wire terminals." This machine, which is shown fractionally in Figure 18, comprises a vertical snout 105 down through which a straight wire 106 is intermittently fed, a disk member 107 which underlies the end of the snout and is turned intermittently, through a revolution at a time, about an axis offset from the snout, and a disk member 108 which is turned intermittently through a revolution at a time about the snout as a center. The disk member 107 has an aperture 109 in line with the snout when the disk member is at rest position, a radial cam 110 on its face adjacent to the snout, and a shear blade 111 on its other face which engages a stationary shear blade 112 as the disk member rotates. The disk member 108 has on its face adjacent to the disk member 107 a cam 113. In the operation of the machine, a length of the wire 106 is fed through the snout and the aperture 109 of disk member 107 while both disk members are at rest. Then during an idle feed period of the wire, the disk members are each turned through one complete revolution. As the disk member 107 turns through the first part of a revolution of movement the blades 111 and 112 engage to shear the wire, leaving a short length of wire projecting from the snout such as is shown in Figure 18. (It is by this shearing action that a formed terminal is cut free from the wire supply, as will hereinafter appear.) Then, as the disk member turns onwardly to complete a revolution of movement, the cam 110 engages this short length of wire and bends it over between the two disk members and into engagement with a slot provided in the end portion of the snout. As the disk member 108 turns through a revolution of movement, the cam 113 engages the bent-over lengths of wire and curls it about the snout, thus placing it into the form of a loop. When the disk members have thus each completed a revolution of movement, another length of wire is fed out through the snout, after which the disk members are each again moved through another revolution of movement. In the initial repeat movement of the disk member 107, the blades 111 and 112 reengage to sever the wire. The wire element which is thus cut off from the wire supply constitutes a formed wire terminal 116 having a shank 116' and a head 116''. By a suitable drive mechanism not herein necessary to show, this terminal forming machine is driven to deliver one formed terminal for each cycle of operations of the terminal-soldering station.

Before the terminal 116 is cut free from the wire supply, it is gripped between a pair of clamping jaws 120 provided on an arm 121. This arm is carried on the upper end of a vertical rod 122 and receives from the rod both up-and-down and lateral movements. The clamping jaws and arm are so controlled that just after a terminal has been projected downwardly from the terminal-forming machine, but before the terminal has been cut free, the arm is swung into a position wherein the jaws embrace the shank of the terminal—which is the position of the arm dottedly shown in Figure 16; the jaws are then closed and the terminal is cut free; and thereupon, the arm is moved downwardly to dip the head of the terminal into a solder bath 123, and is next raised and swung over the table 14 to place the terminal directly overhead the condenser body at the terminal-soldering station, the shank of the terminal being thus placed within the recess of a U-shaped heating element 124' of a soldering iron 124. (See Figures 13, 15 and 16.) In the next succeeding operation the condenser body, terminal and soldering iron are placed into a soldering relation effective to cause the terminal to be soldered to the condenser body. This soldering relation is effected preferably by a push rod 125 which enters the tumbler from the bottom and pushes the condenser body upwardly through its shell against the terminal head with sufficient force to slide the shank of the terminal between the clamping jaws 120 and thus press the terminal head into contact with the soldering iron. After the condenser body, terminal and iron have been held in soldering relation for a predetermined interval, the iron is raised to move it free from the terminal. Thereupon, the clamping jaws are opened, the push rod 125 is withdrawn from the tumbler, and the arm 121 is swung back to the terminal-forming machine. Of these operations, it will be seen that the dipping of the terminal into the solder bath 123 and the placing of the terminal into position to be soldered to a condenser body takes place during the period of advance of the table, and that the actual soldering operation then takes place while the table is at rest. The mechanism by which these operations are carried out are now described in detail.

The arm 121 comprises a member 126 rigidly secured at one end to a head 129 on the rod 122 and terminating at its other end in one of the jaws 120, and a flat member 127 secured slidably to the member 126 by screw and slot connection 128 and having a turned over lug on its outer end forming the other of the jaws 120, the inner end portion of the member 127 being extended slidably through the head 129. As so mounted, the member 127 may slide lengthwise of the member 126 to open and close the jaws 120. These jaws are biased closed by a tension spring 130 connected between the member 127 and head 129, and are opened in the operation of the machine by a cam 131 which acts on an inclined edge 132 provided on the inner end of the member 127, as is hereinafter explained.

The terminal-soldering station 30 has its parts carried by a housing 136 which is secured to the outer side of the main frame 10 as in any suitable way not herein necessary to show. This housing is substantially cylindrical in shape, and is provided with an upright boss 137, as is shown in Figures 13 and 16. The rod 122 extends down through this boss into the housing, and has its lower end portion journalled in a long bearing 138 formed integrally with the housing. Embracing the rod 122 and extending through the boss 137 is a long sleeve 139 which carries the aforementioned cam 131 at its upper end. In turn, embracing the sleeve 139 and journalled to the boss 137 is a tubular shaft 140 which has a circular head 141 secured eccentrically to the upper end thereof. This head has a bottom flange 141' which rests on the top surface 137' of the boss 137 to support the shaft 140 vertically. Journalled to the head between the flange 141' and a nut 201 which is threaded to the shaft 140, is a flat horizontally disposed member 202. This member carries the soldering iron 124 at one end, and is constrained to substantially linear movement at the other end as by means of a tail rod 204 which is secured to the member and extended slidably through an apertured stud 206 that is carried pivotally by an arm 207 of the frame 136.

From the foregoing description, it will be seen that the rod 122 may both pivot and slide in the bearing 138 and sleeve 139 to raise and lower the arm 121 and to swing it laterally. Also, the sleeve 139 may slide vertically on the rod 122 and shaft 140 to press the cam 131 against the edge 132 and thus cam open the clamping jaws 120. (Because the cam 131 is to bear against the edge 132 at different angular positions of the arm 121, the cam 131 is cupped as is shown in Figure 16.) Furthermore, the shaft 140 may be slid vertically to raise and lower the soldering iron and may be rotated to impart a circular oscillatory movement to the iron through the eccentric head 141 acting in conjunction with the movement constraining means for the support member 202 of the iron above described.

The rod 122, sleeve 139 and shaft 140 are adjusted vertically by respective cam mechanisms 145, 146 and 147; and the rod 122 is adjusted angularly by a cam mechanism 148. The cams of each of these mechanisms are pinned to a vertical shaft 149 which is journalled at 150 and 151 to the top and bottom walls of the housing, the shaft being supported vertically by a thrust bearing member 154 having a 1:1 transmission ratio, and the shaft 153' is in turn coupled through 1:1 ratio gearing 153" to a horizontal drive shaft 153, the gearing 153" being provided to enable the shaft 153 to be placed at a level permitting it to be readily coupled to a common drive for the entire machine, as will hereinafter appear. The shaft 153', which is journalled in bearings 155, is driven continuously through one revolution for each cycle of operations of the machine, the shaft 149 thus also receiving one revolution per cycle of operations of the machine by reason of the 1:1 transmission ratio of the gearing 154.

Figure 19:
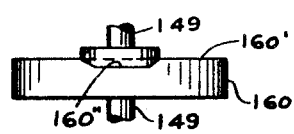
Figure 19 is a side elevational view of the cam for raising the terminal-holding arm of each terminal-soldering station.
Figure 22:
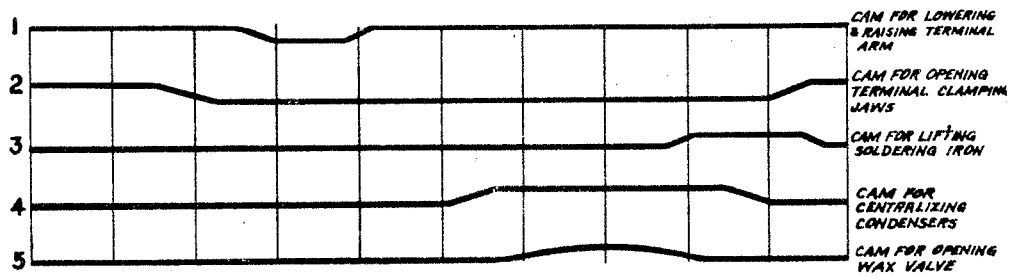
Figure 22 is a chart illustrating the action of certain cams of the terminal-soldering station.

The cam mechanism 145, shown in Figures 13 and 19, comprises a cylindrical cam 160 secured to the shaft 149; an arm 161 above the cam which slidably embraces the shaft 149 at one end and pivots on the rod 122 at the other end; a cam follower 162 journalled to the arm at a point between the shaft 149 and rod 122 and positioned to ride on the cam 160; and a tension spring 163 which serves to bias the rod 122 and arm 161 downwardly and to maintain the follower 162 in contact with the cam 160, this spring being connected between the housing and a hub 165' (of a rocker arm 165 hereinafter explained), which is pinned to the shaft 149 and which bears down pivotally against the arm 161. The cam 160 has a flat or dwell 160' along the greater annular distance thereof, and a recession 160" along its remaining distance, as is shown in Figure 19 and by curve 1 of chart 22. When the cam follower registers with the dwell 160' the arm 121 is held raised at normal level, but as the follower traverses the recession 160" the arm 121 is dipped downwardly by the spring 163. Thus, in each revolution of the shaft 149—which is once for each step of advance of the table— the arm 121 is lowered momentarily from normal level; this lowering is for the purpose of immersing the terminal head in the soldering bath 123, as is hereinafter more fully explained.

The cam mechanism 148 comprises a cam 164 pinned to the shaft 149, the aforementioned rocker arm 165 pinned to the rod 122, and a cam follower 166 (see Figure 17) on the rocker arm which is maintained in contact with the cam 164 under the influence of a spring 167 connected to the rocker arm. The cam 164 has a substantially constant radius along a major portion of its angular length which forms an inner dwell 164', and has a lobe along its remaining angular length providing an outer dwell 164", as is shown in Figure 17. Thus, the arm 121 is reciprocated once during each revolution of the shaft 149. As is hereinafter more fully explained, this reciprocation is so timed that the arm 121 is held stationary over the table 14 as the follower 166 traverses the inner dwell 164', and is held stationary at the terminal-forming machine, in position over the solder bath 123, as the follower traverses the outer dwell 164".

Figure 20:
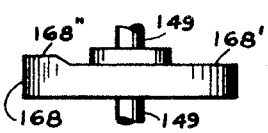
Figure 20 is a side elevational view of the cam for controlling the clamp of each terminal-holding arm.

The cam mechanism 146 is the same in its general construction as that of the cam mechanism 145 above described, it comprising a cylindrical cam 168 secured to the shaft 149, an arm 169 above the cam which slidably embraces the shaft 149 at one end and which is pinned to the sleeve 139 at the other end, a cam follower 170 journalled to the arm in position to ride on the cam 168, and a compression spring 171 interposed between the arm 169 and a bearing 171' on the housing for the sleeve 139 to bias the arm 169 downwardly to maintain the folower in contact with the cam. The cylindrical cam 168 has a major lower-level dwell 168' and a minor higher-level dwell 168" as is shown in Figure 20 and by curve 2 of chart 22. When the follower 170 registers with the lower-level dwell, the sleeve 139 is held in a lower position wherein the cam 131 is out of contact with the edge 132 of the member 127, the clamping jaws 120 being then held closed by the spring 130; but when the follower registers with the higher-level dwell, the cam 131 bears against the edge 132 to hold the clamping jaws open. Thus, during each revolution of the shaft 149, there is a longer period in which the jaws 120 are held closed and a shorter period in which the jaws are held open.

Figure 21:
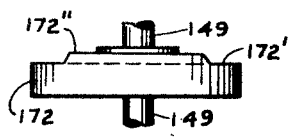
Figure 21 is a side elevational view of the cam for raising the soldering iron of each terminal-soldering station.

The cam mechanism 147, which is likewise the same in its general construction as that of the cam mechanisms 145 and 146, comprises a cylindrical cam 172 secured to the shaft 149, an arm 173 above the cam which slidably embraces the shaft 149 at one end and pivots on the sleeve 139 at the other end, and a cam follower 174 journalled to the arm, between the shaft 149 and sleeve 139, to ride on the cam 172. The shaft 140 is biased downwardly by a spring 175 which presses against a flange 140' on the lower end of the shaft 140 and transmits its pressure through a ball bearing assembly 175' to the arm 173 to maintain the cam follower 174 in contact with the cam 172, the ball bearing assembly being provided because the shaft 140 is rotated during the operation of the machine as is hereinafter explained. The cam 172 has a longer lower-level dwell 172' and a remaining higher-level dwell 172" as is shown in Figure 21 and by curve 3 of chart 22. When the follower 174 traverses the lower-level dwell the head 141 of shaft 140 rests on the boss 137 to hold the soldering iron 124 in a normal or lower-level position, but when the follower traverses the higher-level dwell the soldering iron is held in a raised position. Thus, during each revolution of the shaft 149, the soldering iron is held in a lower position for a longer period and in a raised position for a shorter period. This raising of the iron is for the purpose of moving it out of contact with the terminal to permit the solder to set before any strain may be placed on the soldered joint by any part of the machine in the further operation thereof.

The solder bath 123 is contained in a well 176 shown in Figure 18, which has an entrance passageway 176' through which molten solder is supplied continuously as from a suitable heating pot not shown. The well has an opening 177 in the top thereof through which the terminal heads are lowered in the solder dipping operations above mentioned. To shorten the distance through which the terminals must be lowered to effect this dipping operation, the side wall of the well, past which the terminal moves as it is carried to soldering postiion over the table 14, is cut away at 178. This cut-away is preferably made as deep as is permissible while preventing overflow of the solder, as is indicated in Figure 18. Below the well there is placed a funnel 179 for catching what solder may drip from the terminal as it is carried from the well.

While the terminal is held overhead the condenser body at the terminal-soldering station, the push rod 125 is moved up into the tumbler containing the condenser body to press the body against the head of the terminal and the latter in turn against the bottom face of the soldering iron element 124'. This upward movement of the push rod 125 is preferably effected through a yieldable transmission, for reasons which will be hereinafter apparent, which transmission may comprise a tubular plunger 186 slidably mounted, below the tumbler at the terminal-soldering station, in an offset wall portion 191 of the housing for vertical up and down movement. The plunger has a restricted opening 186' in its upper end a stud 187 threaded into its lower end. A piston 188 is mounted in the plunger and pressed against the upper end of the plunger by a compression spring 190 interposed between the piston and the stud 187. The aforementioned push rod 125 is secured to the piston and extended vertically through the opening 186'. Beneath the plunger is a cam 189, which is pinned to the drive shaft 153, and on the stud 187 is a foot 192 which rides on the cam, the foot being adapted to follow the cam under the influence of a spring 193 which biases the plunger downwardly. This spring is housed in a cylindrical recess 191' in the wall portion 191 and presses downwardly against a post 194 which engages the recess and is carried by a side extension 192' on the foot, as is shown in Figure 13.

The cam 189 has one lobe as is shown in Figure 14, which engages the foot and imparts an upward movement to the plunger once during each revolution of the shaft 153. This upward movement of the plunger is transmitted to the push rod 125 by the spring 190, to cause the push rod to enter the tumbler at the terminal-soldering station and raise the condenser body. As the condenser body is pressed against the terminal, the spring 190 yields somewhat, to take care of varying lengths of different condenser bodies while yet to transmit a substantially even pressure to each body, but is adapted to transmit sufficient force to each body to overcome the friction of the clamping jaws 120 against the terminal, whereby to press the head of the terminal into contact with the soldering iron 124. To hold the condenser body raised and in soldering relation with the terminal and iron for a predetermined interval, the lobe of the cam 189 is provided with a suitable dwell as appears in Figure 14.

In order that the soldering iron will distribute the solder evenly over the end of the condenser body to assure a strong soldered joint, the shaft 140 is rotated continuously to impart a continuous horizontal circular movement to the iron. This rotation of the shaft 140 is derived from the shaft 149 through a set of gears 207 having approximately a 2:1 step up in transmission ratio to insure a substantial horizontal movement of the iron while the same is held in soldering relation with the terminal and condenser body. Since the shaft 140 receives also a vertical movement from the cam mechanism 147, the pinion gear 207' of the gear set 207 is splined at 208 to the shaft 140, and the aforementioned biasing spring 175 for the shaft 140 is interposed between the flange 140' and the pinion gear, the gear being thus pressed upwardly in continuous sliding contact with the top wall of the housing 136.

Figure 23:
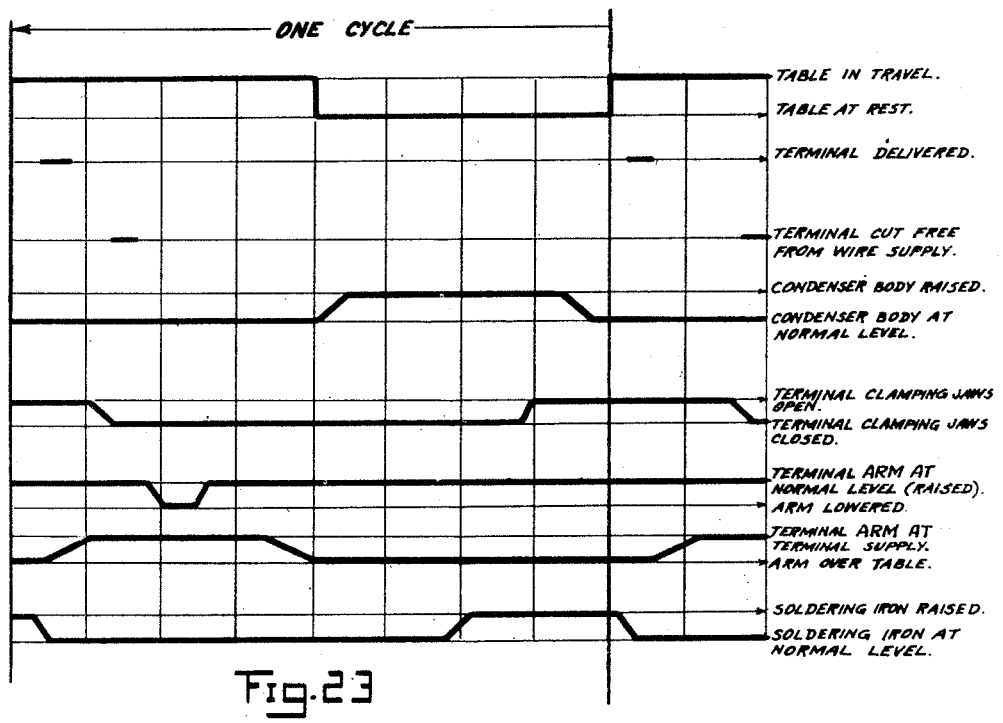
Figure 23 is a chart showing a group of approximate line diagrams illustrating the timing between the various operations performed by the terminal-soldering station, particularly in relation to the travel of the conveyor of the machine.

The timing of the various operations performed by the terminal-soldering station, and their relation to the travel of the table 14, is illustrated approximately by the group of vertically spaced functional diagrams shown in Figure 23, the significance of the respective diagrams being as is indicated in the figure. The horizontal dimensions of these diagrams each represent time to the same scale, each starting with the instant a step of advance of the table is begun; accordingly, the respective conditions of the different operations are represented at any one instant by the points of intersection of a vertical line drawn through the diagrams at such horizontally spaced point as represents the instant selected.

From the foregoing description of the terminal-soldering station and the functional line diagrams of Figure 23, it will be seen that a cycle of operations takes place, once for each step of advance of the table, as follows: At the start of a step of advance of the table, the clamping jaws 120 are held open by the cam mechanism 146 and the arm 121 is held at normal level, by the cam mechanism 145, and in a position overlying the tumbler at the terminal-soldering station by the cam mechanism 148. Immediately following, however, the arm 121 is swung back to the terminal-forming machine; but before the arm is so returned the terminal-forming machine projects a new terminal downwardly above the soldering bath into position for entry into the open jaws of the returning arm 121. Following the return of the arm, the clamping jaws 120 are closed to grip the shank of this terminal. Then, in the sequence here named, the blades 111 and 112 engage to cut the terminal free from the wire supply; the arm 121 is lowered by the cam mechanism, to dip the head of the terminal into the soldering bath 123, and is then swung forwardly over the table by the cam mechanism 148 to place the shank of the terminal into the lateral recess of the soldering iron element 124'. This forward swing of the arm 121 is completed substantially simultaneously with the completion of the interval of advance of the table, the arm and table coming into positions wherein a condenser body is brought directly beneath the head of the terminal. During the ensuing rest period of the table, the plunger 186 is actuated by the cam 189 to move the push rod 125 into the tumbler at the terminal-soldering station and place the condenser body and terminal into soldering relation with the soldering iron 124. After this soldering relation has been maintained for a short interval, the soldering iron is raised by the cam mechanism 147 and again, after a short interval, the clamping jaws 120 are opened. When the weight of the soldering iron is relieved from the terminal head and condenser body, the body will be raised somewhat by the stored energy in the spring 190; however, the iron is raised sufficiently by the cam mechanism 147 to yet free it from the terminal head and give the soldered joint a chance to set before the clamping jaws are opened. Following the opening of the clamping jaws, the push rod is retracted, after which another step of advance of the table is begun, and the arm 121 is returned to take hold of another terminal from the terminal-forming machine. The return of the arm is however delayed until the table has undergone a substantial advance in order that the terminal which has been just soldered will be moved out of the path of the arm before the arm is returned.

Figures 8, 9:
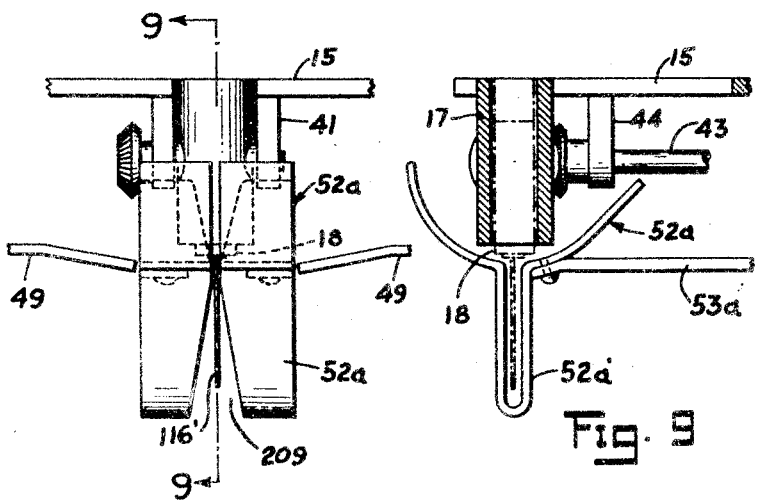
Figure 8 is a partial front view of one of the turning stations between the terminal-soldering or waxing stations.
Figure 9 is a vertical sectional view of the structure of Figure 8, taken substantially on the line 9—9 of that figure.

At two intervals of advance of the table 14 following the first terminal-soldering station, there is located the second turning station 29a for inverting the condenser bodies before they enter the second of the terminal-soldering stations. This turning station is different from the turning station 29 above-described only in that the shape of the curved retaining means for holding the condenser bodies in the tumblers during the inverting operation—the means analogous to the retaining member 52 of the prior turning station—is here provided as two spaced half sections 52a each of which is provided with a depending U-shaped portion 52a' as is shown in Figures 8 and 9. The U-shaped portion is provided in order that the retaining sections will clear the terminals on the condenser bodies as the bodies are conveyed to and from the turning station, and a spacing 209 between the sections is provided in order that the latter will clear the terminals as the condenser bodies are inverted. By the action of this turning station, the terminals which have been soldered to the condenser bodies by the first one of the terminal-soldering stations are moved to lower position while the unsoldered ends are moved to the upper position.

At one step of advance of the table 14 beyond the first terminal-soldering station, there is located the second terminal-soldering station 30a. This station is in all respects identical to the first terminal-soldering station above described, and thus it operates to solder terminals to the upper ends of the successive condenser bodies conveyed thereto, the two terminal-soldering stations accordingly serving to solder terminals to the opposite ends of each condenser body. It will be noted that in the operation of this second terminal-soldering station, the push rod 125, in placing a condenser body into soldering relation with a terminal and the soldering iron, presses against the head of the terminal which has been soldered to the body by the first terminal-soldering station, the rod being offset to clear the shank of the terminal as is shown in Figure 13. The pressing of the push rod here against an effectively longer condenser body does not however substantially alter the pressure with which the body is pressed against the terminal and iron, because this pressure is provided through a yieldable transmission afforded by the spring 190 as has been above described.

*Sealing stations*

The sealing stations herein next described are not claimed herein since the same are described and claimed in my pending divisional application Serial No. 702,874, filed October 11, 1946, and entitled Sealing machine.

Figure 24:
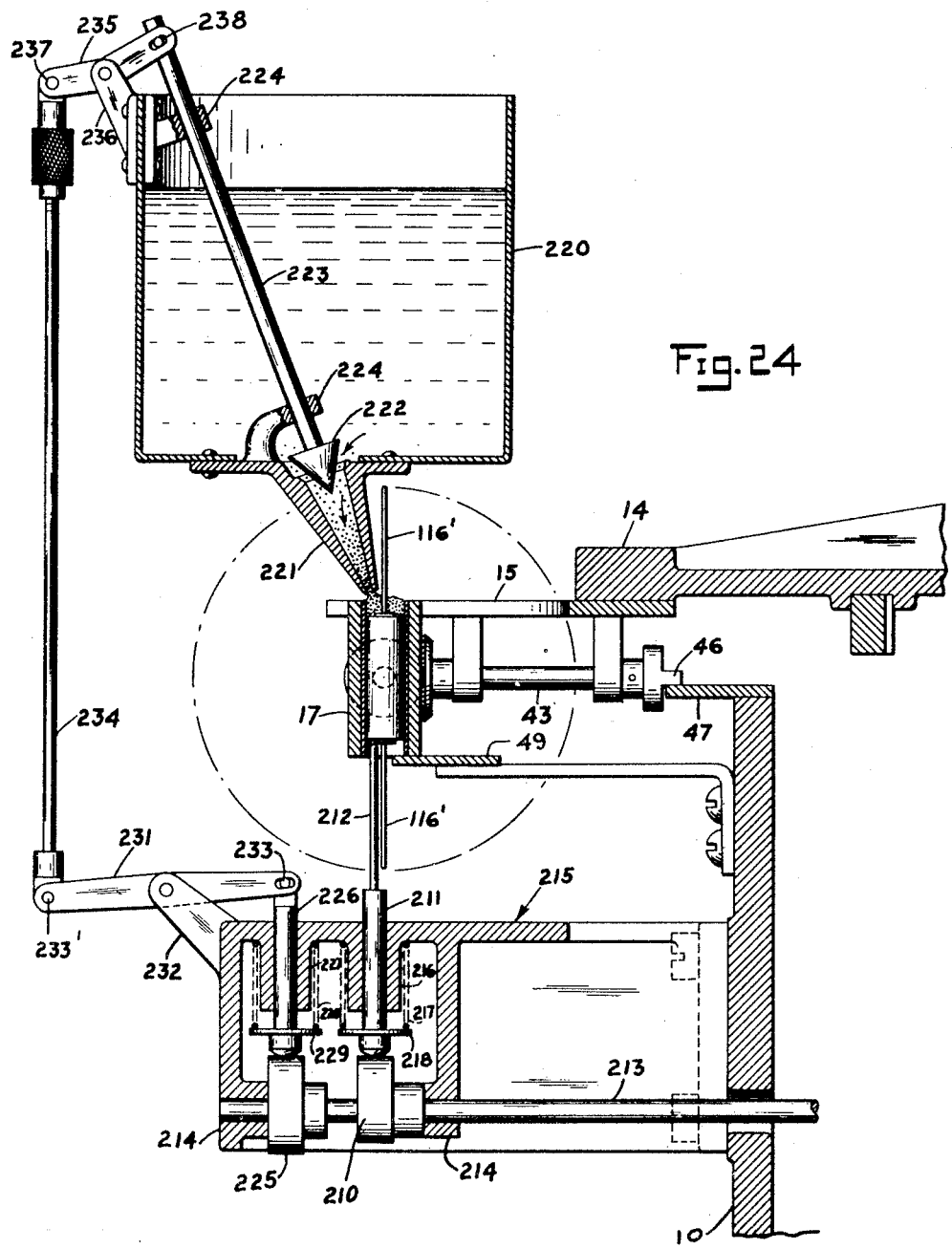
Figure 24 is an enlarged vertical sectional view of the first sealing station taken substantially on the line 24—24 of Figure 1.

Beyond the second terminal-soldering station—as for example at a distance of four intervals of advance of the table 14—there is located the first sealing station 32. At this station the condenser bodies are first centralized in their respective shells to provide equal spaces at the ends, and then the upper end space in the shell is sealed, preferably by filling the end space with a wax or other suitable material. The centralizing is done by a one-lobe cam 210 acting through a plunger 211 and push rod 212 as is shown in Figure 24. The cam 210 is pinned to a horizontal shaft 213 which is journalled at 214 to a housing 215 that is secured to the main frame 10. The plunger 211 is slidably mounted, in a position above the cam 210 and beneath the tumbler at this station, in an apertured boss 216 which depends from the top wall of the housing 215. A downward biasing of the plunger 211, to maintain it in contact with the periphery of the cam 210, is effected by a compression spring 217 which is coiled about the boss 216 and interposed between the top wall of the housing and a collar 218 on the plunger. In the operation of the machine, the shaft 213 is rotated continuously through one complete revolution for each step of advance of the table 14, it being so timed that the lobe of the cam 210 traverses the plunger rod during successive rest periods of the table.

As the plunger traverses the cam lobe, the rod 212 is moved up into the tumbler at this sealing station to centralize the condenser body in relation to its shell, and as the plunger traverses the recession of the cam the rod is retracted from the tumbler. In order that the condenser body will be held centralized for a definite interval, the lobe of the cam 210 is provided with a dwell as is indicated by curve 4 of Figure 22.

While the condenser body is held centralized, a molten wax is poured into the top end space of the condenser shell from a container 220 through a snout 221, the container being supported above the shelf 15 and the snout being extended down from the bottom of the container as is shown in Figure 24. The discharge of the wax from the container is controlled by a metering valve 222 carried on the lower end of a long stem 223 which extends up through the wax to the top of the container, the stem being slidably mounted in bearings 224 to move vertically to place the valve into open and closed positions. The valve is controlled by a one-lobe cam 225 which is pinned to the shaft 213 adjacently of the cam 210. This cam 225 acts on a plunger 226 which is slidably mounted to housing 215 in a boss 227 as in the manner of the plunger 211, the plunger 226 being likewise maintained in contact with the periphery of the cam 225 by a compression spring 228 which is coiled about the boss and interposed between the housing and a collar 229 on the plunger. The plunger 226 is coupled to the valve 222 through a rocker system comprising a lever 231 fulcrumed to a standard 232 of the housing 215 and having at one end a slidable pivotal connection 233 to the plunger 226 and at the other end a pivotal connection 233' to the lower end of a vertically disposed rod 234, and a rock lever 235 fulcrumed to a standard 236 on the container 220 and having at one end a pivotal connection 237 to the rod 234 and at the other end a slidable pivotal connection 238 to the upper end of the valve stem 223. Through this rocker system the valve 222 is opened and closed in response to upward and downward movements of the plunger 226, the plunger being moved upwardly by the cam 225 as it traverses the lobe of the cam 225 and moved down by the spring 228 as it traverses the recession of the cam, a development of the cam being shown by curve 5 of Figure 22. The lobe of the cam 225 is aligned with that of the cam 210, but is preferably provided with less angular length than that of the cam 210 as will appear by a comparison of curve 5 with curve 4 of Figure 22. This is done in order that the valve 222 will be closed to terminate the wax discharge before the push rod 212 is withdrawn from the tumbler.

Following the first sealing station is the turning station 29b, which is in all respects identical to the turning station 29a located between the terminal-soldering stations. This turning station operates to invert the condensers successively and move their unsealed ends to the upper position. However, in order that the wax from the first sealing station will have had time to cool before the condensers are so inverted, the turning station 29b is spaced considerably beyond the sealing station 32 as at a distance of eight intervals of advance of the table, as is shown in Figure 1. At a distance, however, of but one interval of advance of the table from the turning station 29b, there is located the second sealing station 32a. This second sealing station does not include any centralizing means, for the condenser body is here held centralized by the wax supplied by the first sealing station, but is otherwise in all respects identical with the first sealing station.

Short-circuit testing station

Figure 25:
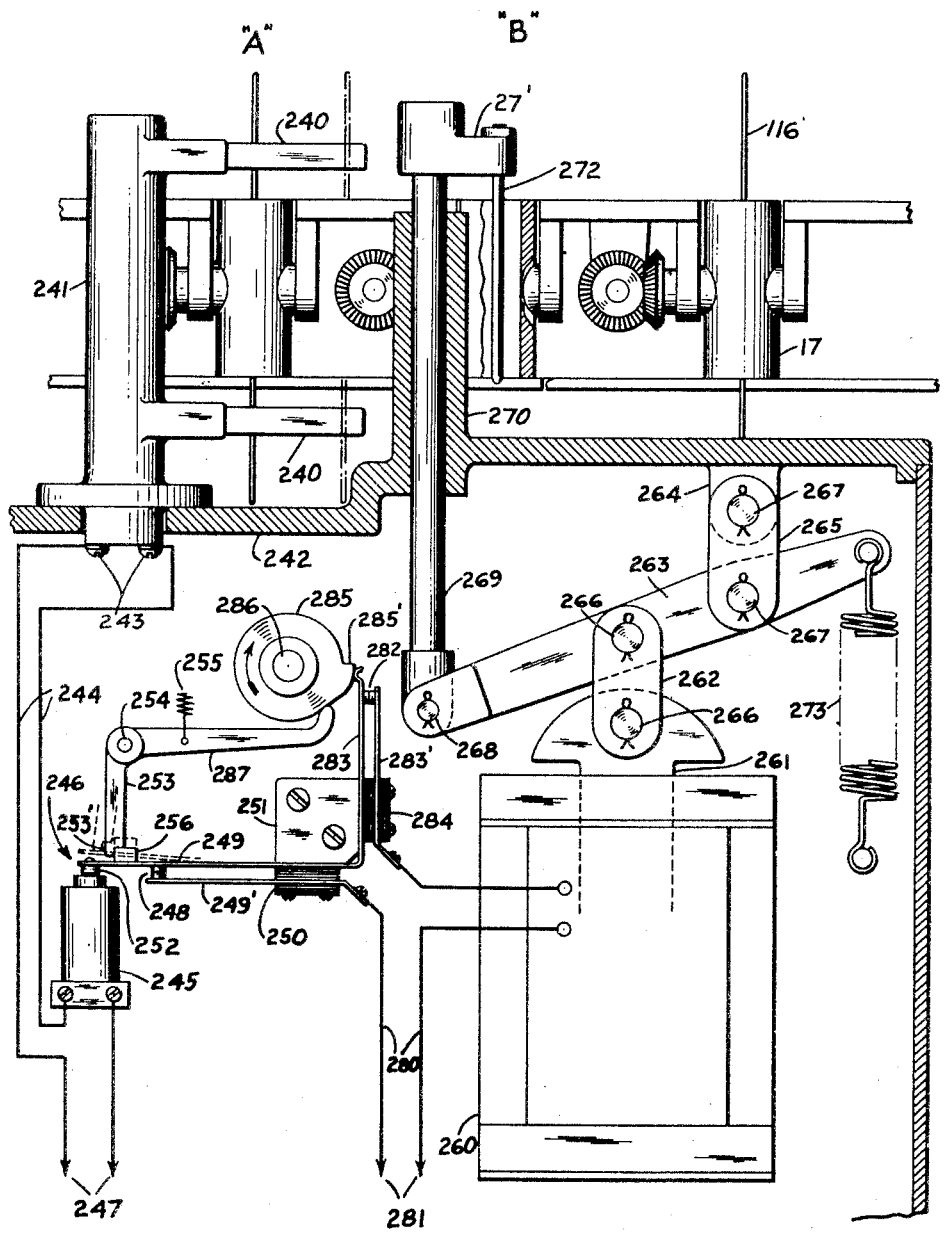
Figure 25 is an enlarged side elevational view, partially in vertical section on the line 25—25 of Figure 1, showing the station for testing the assembled condensers for short circuits.

The short-circuit testing station 34 is located beyond the second sealing station as is shown in Figure 1. This station—which is shown in Figures 25, 26 and 27—operates to test the condensers successively for short circuits during respective successive periods of advance of the table. Whenever a condenser tests as being shorted, the testing means prepares an ejecting means for operation. This ejecting means is then brought into operation during the next succeeding rest period of the table to eject the defective condenser from the table 14. This testing and ejecting means is not claimed herein as the same is claimed in my pending divisional application S. N. 581,643, filed March 8, 1945, and entitled "Automatic machine for electrical condensers."

Reference being had to Figures 25 and 26, it will be seen that as a condenser is carried from one rest postiion A to the next succeeding rest position B, the terminals of the condenser engage a pair of flexible conductor blades 240 which are supported in horizontal positions, one above and one below the shelf of the table 14, by an upright insulating post 241. This post is mounted on a housing 242 fractionally shown, it being understood that the housing 242 is suitably secured to the main frame 10 of the machine. The blades 240 lead respectively to a pair of terminals 243 at the bottom of the post, which are connected in a circuit 244 serially including the actuating coil 245 of a relay 246 and a pair of terminals 247 adapted to make connection with a suitable source of current. The relay coil actuates a switch 248 comprising an upper movtable switch blade 249 and a lower semi-stationary blade 249' held insulatedly in horizontal positions by a stack 250 and bracket 251. The movable blade is biased upwardly, to maintain the switch normally open, but carries an armature 252 by which the blade is pulled down into closed position as the relay coil 245 is energized. Overlying the blade 249 is a vertical detent arm 253 pivoted at 254 and biased, by a spring 255, against the side of a block 256 provided on the top side of the blade. When the blade reaches closed position, the detent arm is snapped over the top of the block under the influence of the spring 255 to latch the switch 248 closed. A step 253' on the end of the detent arm serves by its impingement against the side of the block to define the operative position of the detent arm.

From the foregoing description, it will be seen that as a short-circuited condenser is carried from position A to position B, the relay coil 245 is energized to cause the switch 248 to be latched in closed position. This closing of the switch 248 serves to prepare the ejecting means for operation as is hereinafter explained.

The prime mover for the ejecting means comprises a solenoid 260. This solenoid has a vertically disposed armature 261 coupled by a link 262 to a lever 263 which is supported by a standard 264 through a link 265, the link 262 having pivotal connections 266 to the armature and lever and the link 265 having pivotal connections 267 to the lever and standard. The end of the lever adjacent the armature 261 is pivotally connected at 268 to a rod 269 which slides vertically in a long bearing 270 of the housing 242. To the upper end of this rod there is secured an arm 271 which overhangs the table and carries a downwardly extending pin 212 directly overhead the condenser at the rest position B aforementioned. The rod 269 is normally held in raised position, wherein the pin 272 is above the level of the tumblers 17, by a tension spring 273 acting on the lever 263 as is shown in Figure 25. When the solenoid 260 is however energized the rod 269 is propelled downwardly in opposition to the action of the spring 273 to cause the pin 272 to enter the tumbler at position B and push the condenser downwardly out of the tumbler.

At position B, a portion of the retaining plate 49 is cut away and a trap door 275 is provided in its place. This trap door, which is illustrated in Figure 27, is hinged to the retaining plate at 276 and normally held horizontally in closed position by a tension spring 277 connected between the door and a bracket 278 on the plate. The spring 277, however, yields to the pressure exerted against the door by a condenser being ejected, the trap door then springing back to closed position when the condenser being ejected has fallen free of the door.

The solenoid 260 has a circuit 280 serially including a pair of terminals 281 adapted to make connection with a suitable source of current, the switch 248 hereinbefore described, and another switch 282. This latter switch is of the same type as the switch 248, comprising a movable blade 283 and a semi-stationary blade 283' both held insulatedly in a stack 284 by the aforementioned bracket 251. To simplify the structure, the two movable blades 249 and 283 of the switches 248 and 282 are made integral with one another, the same being bent at right angles as is shown in Figure 25. The blade 283 is biased to open position but is actuated intermittently to closed position by a cam 285 having a hump 285' on the periphery thereof. This cam is secured to a shaft 286 from whence it receives one revolution of continuous rotation for each step of advance of the table 14. The cam is so timed that the hump 285' will engage the switch blade 283 and close the switch 282 during each rest period of the table. Should the switch 248 be open when the switch 282 is thus closed, no action will result from the closing of the switch. However, should the switch 248 have been latched closed in response to a short-circuited condenser having been conveyed from position A to position B, into contact with the blades 240, the subsequent closing of the switch 282 will close the circuit of the solenoid 260, thereby causing the solenoid to be energized and the defective condenser to be ejected from the tumbler while it is at rest at position B.

In the continuing movement of the cam 285 following the closing of the switch 282, the hump 285' comes into contact with a horizontal arm 287 provided on the detent arm 253 and cams the detent arm off from the block 256 to release the switch 248 to open position. This opening of the switch 248 restores the testing means to initial condition—a condition for reoperation—and completes one cycle of operations of the station. The opening of the switch 248 is timed to take place before the next succeeding condenser is brought into contact with the blades 240; thus, the station is rendered ready to test the next succeeding condenser and to again eject the same should it test defective.

Capacity testing station

Figure 28:
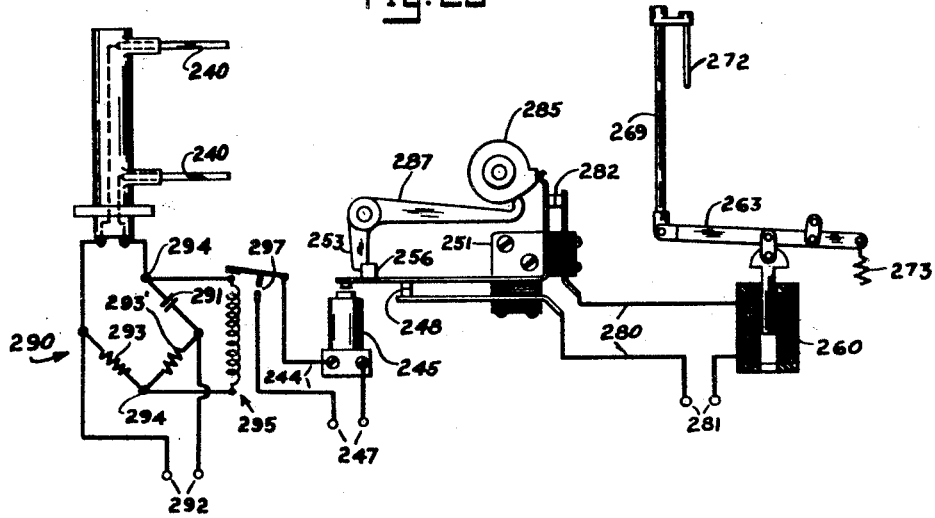
Figure 28 is a view of structure and circuits employed in the capacity testing station of the machine.

The capacity testing station 34a is next in line following the short-circuit testing station just described. This station, which is described and claimed also in my aforementioned pending divisional application S. N. 581,643, distinguishes from the short-circuit testing station principally only in the circuit connection between the blades 240 and the relay 246. In this case, the blades lead to one leg of a capacity bridge circuit 290 which may for example be of the type shown in Figure 28. This type of bridge circuit is well known, comprising a standard fixed condenser 291 in series with the blades 240 (across which the test condenser is applied) and a pair of terminals 292 for making connection with a source of A. C. voltage. Bridging the serial arrangement of these condensers are two resistors 293 and 293' connected in series, the resistors having relative values determined by that which the test condenser is to have in relation to the standard condenser 291. As a typical example, the standard condenser 291 may have a value of capacity equal to that which the test condensers are to have, the resistors then having a unity ratio. When a test condenser deviates from the assigned value of the standard condenser, an unbalance voltage will appear across the junction terminals 294 between the condensers and resistors respectively. This voltage is utilized for actuating the relay 246 to close the switch 248 and prepare the ejecting solenoid 260 for operation.

The prescribed limit of tolerance which the test condenser may have is determined by the amount of unbalance voltage across the terminals 294 required to actuate the relay 246. For close tolerances, there may be provided a sensitive intermediate relay 295 between the terminals 294 and the relay 246. In this case the coil of this relay 295 is connected directly to the terminals 294 and the switch 297 of the relay—which is biased open—is connected serially in the circuit 244 in place of the blades 240 as in the short-circuit testing station. Any condenser under test deviating in capacity from that of the standard condenser 291 to such extent as will create an unbalance voltage across the terminals 294 sufficient to actuate the relay 295 will result in the switch 248 being latched closed. Such condenser will thus cause the solenoid 260 to be prepared for operation. When this condenser comes to rest position at its next succeeding stop position, the solenoid 260 will be actuated through the closing of the switch 282 by the cam 284 as aforedescribed, and that condenser will be then ejected from the machine. Accordingly, this testing station will operate to sort the condensers according to prescribed limits of tolerance, this sorting being such that those condensers whose capacity falls beyond the prescribed limits are here ejected from the machine while the other condensers are carried on by the table to be later ejected by the ejecting station 36, as is now described.

Ejecting station

The ejecting station 36, which is positioned suitably beyond the capacity testing station shown in Figure 1, is not claimed herein as the same is claimed in my aforementioned pending divisional application S. N. 581,643. This station is actuated intermittently during successive rest periods of the table to eject the condensers successively conveyed thereto. The ejecting operation is performed by pushing the condensers down through their tumblers into a chute 300 which directs the condensers into a suitable container not shown. However, in accordance with my invention, each condenser is displaced upwardly in relation to its tumbler before each ejecting operation. This upward displacing of the condenser is adapted to break off any excess wax which may have been deposited over the lower edges of the condenser in the sealing operation, as will the downward ejecting of the condenser serve to break off such excess wax at the top end of the condenser, as in view of the snug fit which the shells have with the tumblers. Both of these operations are performed by the ejecting station as is now explained.

The ejecting mechanism is shown in detail in Figures 29, 30 and 31, and comprises an upright plunger 301 mounted to slide vertically in a boss 302 of a housing 303 that is secured suitably to the side of the main frame 10. The plunger extends above the level of the table 14 and has an arm 304 secured to the upper end thereof which overhangs the table and carries a depending rod 305 positioned in line overhead with the bore of the tumbler at the ejecting station. The lower end of the plunger has a slidable pivotal connection 306 to a rock lever 307 which is pivoted at 308 to the housing. Journalled to the rock lever, between the pivots 306 and 308, is a roller 309 which rides on a cam 310 under the influence of a spring 311 acting on the lever to bias the plunger downwardly. The cam 310 is carried by a shaft 312 from which it receives one revolution of continuous movement for each step of advance of the table 14. This cam has a dwell 310' along a major peripheral distance thereof and a recession 310'' along substantially its remaining peripheral distance. The cam is so timed with the travel of the table 14 that the roller 309 registers with the dwell 310' while the table is being advanced, to hold the plunger stationary at normal level wherein the rod 305 is held raised above the level of the tumblers. When the table is at rest, however, the roller traverses the recession 310'' of the cam and causes the plunger to receive a downward reciprocation, under the action of the spring 311, to move the rod 305 into the tumbler and eject the condenser therefrom, the retaining plate 49 being here removed so as not to obstruct the path of the condenser being ejected.

To impart an upward displacement to the condenser before each ejecting operation just described, there is mounted on the plunger a lateral pin 313 which has an upturned finger 314. This pin is secured to a collar 315 which is within a cylindrical recess 316 extending down into the boss 302 and which slidably embraces an upper reduced-diameter portion 301' of the plunger. The collar is pressed downwardly against a shoulder 317, formed on the plunger incident to reducing the diameter of the portion 301', by a compression spring 318 interposed between the collar and a plug 318' threaded into the recess 316. The pin 313 extends through a slot 319 in the wall of the recess which is curved, as is shown in Figure 30, to cam the pin back and forth about the plunger as a center as the collar 315 is reciprocated vertically, this camming of the pin being such as to place the pin directly below the tumbler at the ejecting station, with the finger 314 in line with the bore of the tumbler, when the collar is in raised position, and to place the pin off to the side of the tumbler, in the position shown by dash-dot lines in Figure 31, when the collar is in lowered position. On the cam 310, at a point just preceding the recession 310'', is a hump 321 which serves to raise the plunger above normal level and to place the collar 315 into raised position before each ejecting operation, the pin 313 being thus moved to cause the finger thereof to bear against the condenser to be ejected and displace it vertically. When the plunger is then next lowered the pin 313 is first retracted and spaced laterally of the tumbler and then the condenser is ejected downwardly out of the tumbler. When the plunger has been restored to normal level following an ejection operation, it will be held there by the dwell 310' of the cam 310 while the table is being advanced, after which the ejecting mechanism will be again actuated in the manner above described.

Scraping stations

Between the ejecting station just described and the loading station there are provided a set of upper and lower stationary knives 320 and 320' which are positioned respectively in line horizontally with the upper and lower ends of the tumblers 17. These knives serve, as the tumblers pass thereby, to scape the ends of the tumblers and thus remove any surplus wax which may have been deposited thereon at the sealing stations.

Drive mechanism

Figure 32:
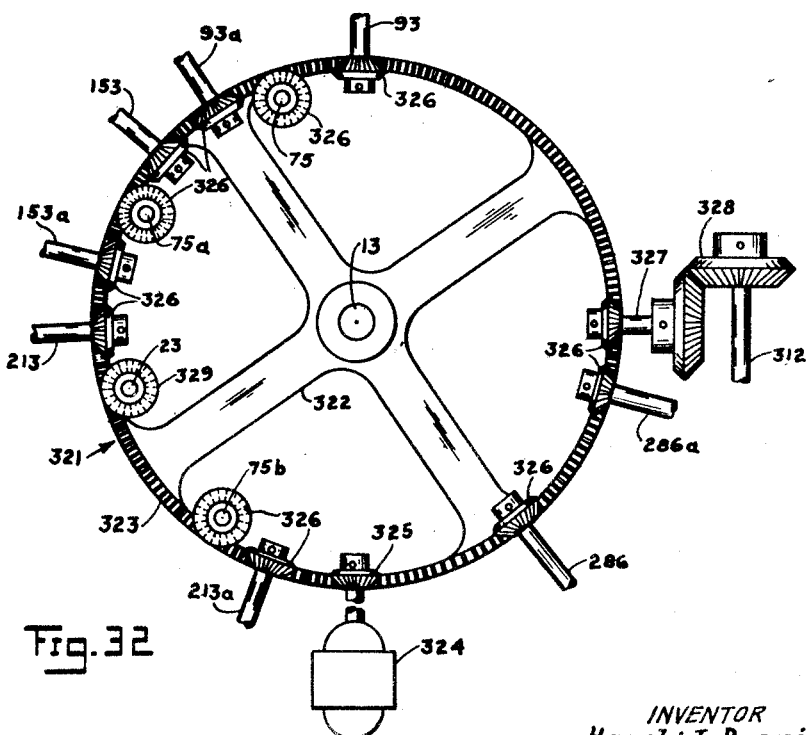
Figure 32 is a fragmentary plan view of the drive mechanism for the entire machine.

A common centralized drive mechanism for the machine is shown in Figure 32. This drive mechanism comprises a large central gear 321, in the form of a spider 322 having an upright toothed annular flange 323, which is journalled to the central shaft 13 of the machine below the table 14, as is shown in Figure 2. This gear is driven by a motor 324 through a pinion 325. In mesh with the gear 321 at points radially in line with the respective surrounding stations of the machine are pinions 326 which are secured to the respective drive shafts of the stations hereinbefore described (except in the case of the ejecting station as is hereinafter explained). For instance, the driven pinions for the three turning stations, 29, 29a and 29b are secured to the respective vertical drive shafts 75, 75a and 75b; for the tinning stations 28 and 28a to the respective horizontal drive shafts 93 and 93a; for the terminal-soldering stations 30 and 30a to the respective horizontal drive shafts 153 and 153a; for the sealing stations 32 and 32a to the respective drive shafts 213 and 213a; for the testing stations 34 and 34a to the respective drive shafts 286 and 286a; and for the ejecting station to a horizontal shaft 327 which is coupled through 1:1 ratio bevel gearing 328 to the drive shaft 312, the gearing 328 being necessary because of the right angle orientation of the shaft 312 to the radial shaft 327. Also in mesh with the gear 321 is a pinion gear 329 for driving the ratchet advance mechanism for the table 14, this gear 329 being directly connected to the shaft 23 as shown. In this drive mechanism, the pinion 326 for each station of the machine has the same diameter as that of the pinion 329 of the advance mechanism for the table. Thus, as aforementioned, the drive shaft of each station receives one revolution of continuous movement for each step of advance of the table 14.

It will be seen from the foregoing description that I have provided a reliable and practical machine for the commercial production of electrical condensers. While the machine herein shown and described represents a preferred embodiment of my invention, it will be understood that this embodiment is illustrative and not limitative of my invention, as the same is subject to many changes and modifications without departure from the scope of my invention, which I endeavor to express according to the following claims.

I claim:

1. Apparatus for soldering a terminal to an open-end of a condenser body comprising an open-ended, vertically held, tubular container for holding said body, means to place a terminal adjacent the upper end of said container, a plunger moved into the lower end of said container against said condenser body to raise said body relatively of said container and press the same into contact with said terminal, and means above said container for soldering the terminal to said body as the terminal and body are held in contact with each other.

2. In a machine for soldering terminals to each of a series of condenser bodies in succession: the combination of a soldering iron; a conveyor for carrying said condensers successively past said iron; means for carrying terminals to said condensers in succession and each in a position wherein a portion of the terminal is held movably between the respective condenser and said iron; means actuated intermittently to move the respective condensers against the corresponding terminals and into soldering relation with said iron; means to effect a retracting movement of said iron to place the same out of said soldering relation, and means to restore said iron to normal position preliminary to each operation of said intermittently actuated means.

3. In a machine of the character described: the combination of a vertically held open-ended container for a condenser body; a soldering iron above said container; releasable means for frictionally engaging the shank of a headed terminal to hold the head of the terminal between said body and iron; means for yieldably pressing said body upwardly against said terminal head and for sliding the terminal shank relatively of said engaging means to press the terminal head against said iron; means to move said iron free from said terminal head while said pressing means is in actuated condition; and means to thereafter release said engaging means and to restore said pressing means to unactuated position.

4. Apparatus for soldering terminals to a series of condenser bodies in succession, comprising intermittent conveying means for advancing said bodies through intervals along a prescribed path; a solder bath; means operated during each period of advance of said conveying means for dipping successively terminals in said bath and thereafter carrying the same into position adjacent successive ones of said bodies; and means operated during each ensuing rest period of said conveying means to solder said terminal to said predetermined one of the bodies.

5. In a machine of the character described: the combination of intermittent conveying means for advancing condenser bodies through intervals along a prescribed path; a terminal supplying means at the side of said conveying means; a reciprocable terminal-holding means mounted to move from said supplying means over said conveying means against the direction of advance of the latter whereby to carry terminals into a position to be soldered to successive condenser bodies during successive rest periods of said conveying means; and intermittent reciprocating means for said terminal-holding means timed to retain the latter in soldering position until after the start of each advance of said conveying means.

6. Apparatus for automatically soldering terminals to condenser bodies comprising an intermittently operated conveyor for moving said bodies successively to a predetermined position; a solder bath; means timed with said conveyor for dipping successive terminals into said solder bath and placing the same in juxtaposition with successive condenser bodies; and means operated automatically to solder said terminals to said condenser bodies respectively during successive rest periods of said conveyor.

7. In apparatus of the character described: the combination of a soldering element; means for holding a condenser element adjacent to said soldering element; means frictionally engaging the shank of a terminal and holding the terminal between said soldering and condenser elements; and yieldable means for moving one of said elements against said terminal and towards the other of said elements while the latter is held stationary in directions of movement of the former, said yieldable means being adapted to overpower the frictional grip of said engaging means on said terminal and to slide the terminal relative to the engaging means.

8. In a machine for soldering terminals to condenser bodies comprising a mechanism for successively feeding out and severing off terminals from a continuous stock, and an intermittently advanced conveyor for said condenser bodies: the combination of a releasable terminal-holding means moved in timed relation with said conveyor for carrying said terminals successively from said mechanism to said condenser bodies in succession; means for soldering said terminals to said bodies respectively; and an operating means associated with said holding means and timed with said conveyor for causing the holding means to grip each terminal prior to the severing thereof from said stock and to release the terminal following the soldering thereof to a condenser body.

9. The combination set forth in claim 5 wherein said terminal holding means comprises a pair of releasable clamping members; means for soldering said terminals to said bodies respectively during successive rest periods of said conveyor; and means timed with said conveyor for releasing said clamping members prior to the expiration of each of said rest periods.

10. In a machine of the character described: the combination of an intermittently operated conveyor for advancing condenser bodies through intervals along a prescribed path; a terminal-supplying means; a pair of terminal clamping members pivoted for reciprocation between said supplying means and a work position adjacent successive condenser bodies during successive rest periods of said conveyor; means at the pivot axis of said clamping members for opening and closing the latter; and cam means timed with said conveyor for swinging said clamping members to said supplying means, closing the clamping members, returning the clamping members to said work position and thereupon opening the clamping members, in the sequence here named.

11. In a machine for producing electrical condensers: the combination of an intermittently advanced conveyor for carrying condenser parts from one work position to another, said conveyor having a series of vertical open-ended containers for receiving said condenser parts, said containers being pivoted to said conveyor on axes substantially parallel to the path of travel of the containers; means timed with said conveyor for turning said containers successively about their said axes at a station between said work positions during successive rest periods of said conveyor; a stationary rail below said containers and extending along the path of said conveyor for retaining said condenser parts in said containers; and a transverse stationary rail at said station curved upwardly from said first mentioned rail for retaining said condenser parts in said containers as the containers are turned.

12. In a machine for producing electrical condensers: the combination of an intermittently advanced conveyor having a series of vertical open-ended containers for said condensers, said containers being pivoted to said conveyor on axes substantially parallel to the path of travel of the containers; and said condensers having terminals depending below said containers; a stationary rail along the path of said conveyor and partially closing the bottom openings of said containers for retaining said condensers in said containers while clearing said terminals; means for turning said containers successively about their said pivot axes at a station along said conveyor during successive rest periods of the latter; and a transversely extending rail at said station curved upwardly from said first mentioned rail for retaining said condensers in said containers as the containers are turned, said last mentioned rail having a terminal clearing opening therein a portion of which extends along said path in line with the depending positions of said terminals and another portion of which is transverse to said path.

13. A mechanism for soldering a headed terminal to a body, comprising a heated iron adjacent to said body, said iron having a transverse recess therein; means for holding a headed terminal in position wherein the shank of the terminal passes through said recess and the head of the terminal lies between said iron and body; and means imparting a rotary movement to said iron in directions transverse to the adjacent surface of said body and within the range of freedom of said shank in said recess.

HAROLD I. DANZIGER.

REFERENCES CITED

The following references are of record in the file of this patent:

UNITED STATES PATENTS

| Number | Name | Date |
|---|---|---|
| 1,485,066 | Bricken | Feb. 26, 1924 |
| 1,743,755 | Casella | Jan. 14, 1930 |
| 1,794,733 | Regenstreif | Mar. 3, 1931 |
| 1,055,839 | Tucker | Mar. 11, 1913 |
| 2,053,946 | Donovan | Sept. 8, 1936 |
| 1,975,938 | Grover | Oct. 9, 1934 |
| 1,763,738 | Avis | June 17, 1930 |
| 1,905,476 | Lorenz | Apr. 25, 1933 |
| 2,291,445 | Beyer | July 28, 1942 |
| 2,016,455 | Purdy | Oct. 8, 1935 |
| 1,702,808 | Brenzinger | Feb. 19, 1929 |
| 2,158,350 | Allen | May 16, 1939 |
| 928,172 | Bernardin | July 13, 1909 |
| 959,986 | Zapf | May 31, 1910 |
| 1,747,581 | Frazier | Feb. 18, 1930 |
| 2,307,114 | Dichter | Jan. 5, 1943 |
| 2,216,141 | Sinclair | Oct. 1, 1940 |

(Other references on following page)

| Number | Name | Date |
|---|---|---|
| 2,284,575 | Johnson | May 26, 1942 |
| 1,562,479 | Whitaker | Nov. 24, 1925 |
| 1,918,118 | Marzocchi | July 11, 1933 |
| 1,934,250 | Wynne | Nov. 7, 1933 |
| 1,975,035 | Bata | Sept. 25, 1935 |
| 1,677,133 | Ford | July 17, 1928 |
| 2,308,606 | Ingerson | Jan. 19, 1943 |
| 1,705,971 | Gray | Mar. 19, 1929 |
| 1,651,399 | Madden | Dec. 6, 1927 |
| 301,578 | Edwards | July 8, 1884 |
| 1,884,683 | Hermani | Oct. 25, 1932 |
| 1,502,773 | Gueritey | July 29, 1924 |
| 1,873,150 | Phelps et al. | Aug. 23, 1932 |
| 1,699,091 | Butler | Jan. 15, 1929 |
| 2,007,698 | Tear | July 9, 1935 |
| 1,951,856 | Blake | Mar. 20, 1934 |
| 2,067,521 | Danziger | Jan. 12, 1937 |
| 1,885,992 | Coyle | Nov. 1, 1932 |
| 1,876,821 | Dugan | Sept. 13, 1932 |
| 1,379,684 | Griffin et al. | May 31, 1921 |
| 1,385,783 | Gillette | July 26, 1921 |
| 1,983,808 | Poole | Dec. 11, 1934 |
| 2,086,684 | Taylor | July 13, 1937 |
| 2,320,452 | Allenbaugh et al. | June 1, 1943 |
| 1,564,353 | Johnson | Dec. 8, 1925 |
| 1,574,631 | Mirfield | Feb. 23, 1926 |
| 1,911,302 | Brown | May 30, 1933 |
| 2,087,809 | Nichols et al. | July 20, 1937 |
| 958,374 | Heller | May 17, 1910 |
| 985,691 | Nungesser | Feb. 28, 1911 |
| 1,436,311 | Graves | Nov. 21, 1913 |
| 2,183,550 | Deutschmann | Dec. 19, 1937 |
| 1,660,324 | Donnelly | Feb. 28, 1928 |
| 2,164,285 | Schutz | June 27, 1939 |
| 2,207,179 | Schreiber | July 9, 1940 |
| 1,771,473 | Westrip | June 29, 1930 |
| 1,873,428 | Klaucke | Aug. 23, 1932 |
| 2,051,090 | Ladewig | Aug. 18, 1936 |
| 2,140,864 | Taylor | Dec. 20, 1938 |

FOREIGN PATENTS

| Number | Country | Date |
|---|---|---|
| 389,236 | British | Mar. 16, 1933 |